(12) United States Patent
Cutler et al.

(10) Patent No.: US 8,111,282 B2
(45) Date of Patent: Feb. 7, 2012

(54) SYSTEM AND METHOD FOR DISTRIBUTED MEETINGS

(75) Inventors: Ross Cutler, Duvall, WA (US); Yong Rui, Sammamish, WA (US); Anoop Gupta, Woodinville, WA (US)

(73) Assignee: Microsoft Corp., Redmond, WA (US)

( * ) Notice: Subject to any disclaimer, the term of this patent is extended or adjusted under 35 U.S.C. 154(b) by 740 days.

(21) Appl. No.: 12/191,270

(22) Filed: Aug. 13, 2008

(65) Prior Publication Data

US 2009/0046139 A1    Feb. 19, 2009

Related U.S. Application Data

(62) Division of application No. 10/608,313, filed on Jun. 26, 2003, now Pat. No. 7,428,000.

(51) Int. Cl.
*H04N 7/14* (2006.01)
(52) U.S. Cl. .................... 348/14.01; 455/550.1
(58) Field of Classification Search ..... 348/14.01–14.18
See application file for complete search history.

(56) References Cited

U.S. PATENT DOCUMENTS

| | | | | |
|---|---|---|---|---|
| 5,572,278 A * | 11/1996 | Hamada et al. | ................. | 396/49 |
| 5,572,728 A * | 11/1996 | Tada et al. | ............... | 348/E7.081 |
| 5,751,285 A * | 5/1998 | Kashiwagi et al. | ........... | 715/833 |
| 5,850,250 A * | 12/1998 | Konopka et al. | ........... | 348/14.07 |
| 6,072,522 A * | 6/2000 | Ippolito et al. | ............... | 348/14.1 |
| 6,179,426 B1 * | 1/2001 | Rodriguez et al. | .............. | 353/69 |
| 6,839,067 B2 * | 1/2005 | Liu et al. | ................. | 348/E7.079 |
| 7,113,201 B1 * | 9/2006 | Taylor et al. | ............... | 348/14.08 |
| 7,428,000 B2 * | 9/2008 | Cutler et al. | ............... | 348/14.11 |
| 2002/0052735 A1 * | 5/2002 | Nagano et al. | ............... | 704/207 |
| 2008/0127260 A1 * | 5/2008 | Hong et al. | ..................... | 725/39 |

* cited by examiner

*Primary Examiner* — Curtis Kuntz
*Assistant Examiner* — Maria El-Zoobi
(74) *Attorney, Agent, or Firm* — Lyon & Harr, LLP; Katrina A. Lyon

(57) ABSTRACT

A system and method for teleconferencing and recording of meetings. The system uses a variety of capture devices (a novel 360° camera, a whiteboard camera, a presenter view camera, a remote view camera, and a microphone array) to provide a rich experience for people who want to participate in a meeting from a distance. The system is also combined with speaker clustering, spatial indexing, and time compression to provide a rich experience for people who miss a meeting and want to watch it afterward.

16 Claims, 13 Drawing Sheets

(5 of 13 Drawing Sheet(s) Filed in Color)

SYSTEM AND METHOD FOR DISTRIBUTED MEETINGS

This is a division of prior application Ser. No. 10/608,313 filed Jun. 26, 2003 now U.S Pat. No 7,428,000.

BACKGROUND

1. Technical Field

This invention is directed toward a system and method for conducting a distributed meeting. More specifically, the invention is directed toward a system and method for two-way audio/video/data conferencing that includes a recording capability, as well as enhanced browsing of an archived meeting.

2. Background Art

Meetings are an important part of everyday life for many workgroups. Often, due to scheduling conflicts or travel constraints, people cannot attend all of their scheduled meetings. In addition, people are often only peripherally interested in a meeting such that they want to know what happened during the meeting without actually attending. Being able to browse and skim a recorded meeting in these cases could be quite valuable.

Today, a variety of live teleconferencing systems are available commercially. A considerable overlap exists between the domain of recording meetings and watching them afterward and the domain of live teleconferencing. For example, both recorded meetings and live video conferences require audio-visual capturing equipment, and both can use sound source localization (SSL) to track the person who is speaking. For instance, if a Pan Tilt Zoom (PTZ) camera is used to capture video data of a person speaking, the system can direct the camera to focus on the correct person. If an omni-directional camera is used to capture the video data, the system can cut directly to that person by using sound source localization (SSL). Commercial video teleconferencing (VTC) systems available today use only audio-based SSL to locate the speaker. While this approach works most of the time, it has two limitations. First, its spatial resolution is not high enough. Second, it may lose track and point to the wrong direction due to room noise, reverberation, or multiple people talking at the same time.

Besides video conferencing systems, there also exist web-based conferencing systems. However, the meeting playback capabilities are extremely limited or non-existent for these web-based conferencing system.

In addition to video conferencing, there has also been recent interest in automatic meeting recording systems, e.g., from FX PAL, Georgia Tech, and PolyCom's StreamStation. However, they are limited in their use of advanced technologies. For example, the former two systems mentioned mainly focus on recording slides, notes and annotations. In addition, they focus more on the User Interface (UI) of their systems instead of the technology necessary to enhance meeting recording and playback. They use relatively primitive methods to identify who is talking in the meeting. Sophisticated indexing to allow a user to easily review the highlights of the meeting is also lacking. The integration of a variety of data capture devices is also limited and no sophisticated meeting analysis tools are available.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The invention is directed toward a system and method called the Distributed Meeting (DM) system that provides high quality two-way conferencing and recording of meetings, as well as rich browsing of archived meetings enhanced through a number of analysis techniques. The system uses a variety of capture devices (360° omni-directional camera, whiteboard camera, presenter view camera, remote view camera, microphone devices and arrays and a graphics capture device) to give a rich experience to local and remote meeting participants. These capture devices are all synchronized to provide an integrated, scalable system and method for two-way conferencing, broadcasting, recording and viewing meetings or other events. Archived meetings can be quickly viewed using speaker filtering, spatial indexing, time compression and a number of analysis tools.

In general, the DM system and method not only records notes and drawings on the whiteboard, but also captures 360° video and audio. The system uses technology, in addition to the UI, that provides enhanced meeting playback (e.g., rich meeting indexing, robust person tracking combined with Sound Source Localization (SSL), extraction of whiteboard and PC graphics key frames, meeting catch up mode, time compression and so forth). The DM system is designed to support remote viewing and participation in meetings as they occur and viewing of meetings after they have finished. It has a modular, scalable design and can use combinations of a variety of input devices to capture meetings. For live meetings, the system broadcasts the multimedia meeting streams to remote participants, who use a network for low-latency duplex voice and data communication. The meetings can also be recorded to disk and viewed on-demand. Post-processing of recorded meetings provides on-demand viewers with indexes of the whiteboard content (e.g., jump to when this was written) and speakers (e.g., only show me the parts when this person speaks). On-demand viewers can also use time compression to remove pauses in the meeting and speed up playback without changing the audio pitch of the speakers.

The following paragraphs more specifically discuss the DM system with respect to the system being used in a meeting, however components of the DM system and method can be used for other events besides meetings.

As discussed previously, the DM system and method can be used for broadcasting a meeting to one or more remote clients; recording a meeting; and browsing of a recording of a meeting. The DM system has multiple cameras that simultaneously capture different sub-events occurring in a space where an event occurs, such as a meeting room. In one embodiment, the DM system also has at least one server or other suitably configured computer that is capable of storing and distributing the captured data to one or more clients in network connection with the server. The cameras can include a 360-degree camera centrally positioned to monitor in 360 degrees the space in which the event occurs; a remote view camera positioned so as to capture a view of event participants in the meeting room; a presenter view camera positioned so as to capture a view of the front of the meeting room where a presenter is typically presenting; and a whiteboard capture camera positioned so as to capture strokes written on a whiteboard. The cameras can be used in various combinations. In one embodiment of the DM system the omni-directional camera has a set of cameras configured in a circular back-to-back fashion. The DM system can also include a panoramic stitcher that stitches together images captured from each camera to create a panoramic image of the meeting room.

The DM system and method can also include a virtual director module that automatically switches between the aforementioned cameras to display a meeting-appropriate view of a speaker or other meeting data. The view displayed can also be manually set by a user.

The DM system also has one or more microphone devices or microphone arrays that simultaneously capture audio data that is synchronized with the image data recorded by the various cameras. A given microphone device or array can be used to determine the direction from which an event participant is speaking by using sound source localization. Optimally, camera data is used in combination with sound source localization to refine the determined direction from which the event participant that is speaking. The omni-directional camera, presenter view camera and remote view camera all can have microphone arrays associated with them.

The DM system and method according to the invention can also include a projector for projecting meeting or other even materials onto a screen. A monitor or television may also be included to display one or more remote participants or other meeting/event materials. The DM system also can have a kiosk that is used to control broadcast, recording and playback of the meeting or other event. In one embodiment a graphics capture device is used to capture graphics data used in the meeting, such as electronic slides that are part of an electronic presentation.

Although all functions and processes of the DM system can be performed by employing one server, one embodiment of the DM system has a separate archive server on which recorded events are stored. In this embodiment, this archive server is used to provide recorded events to one or more clients. In another embodiment, instead of using a separate server, a computer is built in to the 360-degree camera. This computer integrated into the 360-degree camera performs the functions necessary for broadcasting the meeting or other event, and a separate server is not necessary.

The DM system and method can have many tools that enhance and enrich the meeting conduct and playback experience. One such tool involves determining key frames that summarize meeting events by analyzing whiteboard images captured by the whiteboard camera. These key frames in one embodiment of the invention are determined by extracting the image just prior to erasure of a significant percentage of strokes on the whiteboard. Key frames can also be determined by the graphics capture device. For example, such key frames would correspond to the electronic slides of an electronic presentation.

The DM system also has a substantial number of tools for indexing the meeting recording that enhance meeting playback. These indexing tools include the following, which can be used alone or in combination with each other. In one case, as mentioned above, whiteboard key frames that summarize meeting events are determined by analyzing the images captured by said whiteboard camera. These key frames are then used as an index to the corresponding portion of audio and images of the meeting. Similarly, screen graphics key frames are determined and used to index to the corresponding portions of the meeting. Another tool used for indexing is by determining who is speaking at a given time. The audio of each speaker is then segmented out to be accessible on an individual basis. Another DM system indexing tool determines a timeline outlining the sequence of events occurring in the meeting. This timeline is then used to access a specific portion of the audio or images of the meeting. Yet another indexing method employed by the DM system uses speech recognition to transcribe the audio of the meeting. Word searches can then be used to locate specific portions of the audio and corresponding video of the meeting. Word searches can be done by regular or by phonetic spelling. Similarly, a conventional tone of voice recognizer can be used and the meeting content can be indexed by tone of voice used at various times. Yet another method of indexing determines the speaker turn rate, where speaker turn rate is the number of speakers of a given period of time (e.g., speakers/min). The meeting can then be indexed by speaker turn rate. A high speaker turn rate can be used, for example, to identify heated discussion in the meeting. Other indexing means can also be used.

The DM system and method can also include a time compression feature and meeting catch up mode that can be used to adjust meeting playback speed. Time compression appropriately slows down or speeds up playback of the audio signal. Similarly, the video sequence synchronized with the audio signal is sped up or slowed down. The time compression feature can be applied to the audio signal of a single speaker. Additionally, it should be noted that the audio signal of each speaker can be segmented out without using the time compression feature. A fast forward function allows skipping of a portion of the audio, and associated video, of one or more speakers.

In one embodiment, the DM system includes a feature whereby DM recorded audio and associated video can be synchronized with an electronic note-taking program.

The DM system and method also includes an enhanced graphical user interface (UI) for viewing and playing back event data. This UI includes a speaker image display pane that displays the current speaker. The UI also includes a panoramic image display pane that displays a panoramic image derived from the 360-degree camera. A whiteboard display pane displays the content written on a whiteboard. The key frames that summarize the whiteboard and graphics capture data can also be displayed. Additionally, thumbnail views of these key frames are displayed. If a user selects one of these thumbnail views the corresponding key frame will be displayed in the whiteboard pane. The graphical user interface also can have an event timeline display. This timeline provides a graphical representation of events of the recorded meeting. A timeline control allows a user to sequence backwards and forwards in the event timeline, or to stop. This timeline can be used to linearly sequence forwards and backwards in an image and audio sequence.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent or patent publication with color drawing(s) will be provided by the U.S. Patent and Trademark Office upon request and payment of the necessary fee.

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
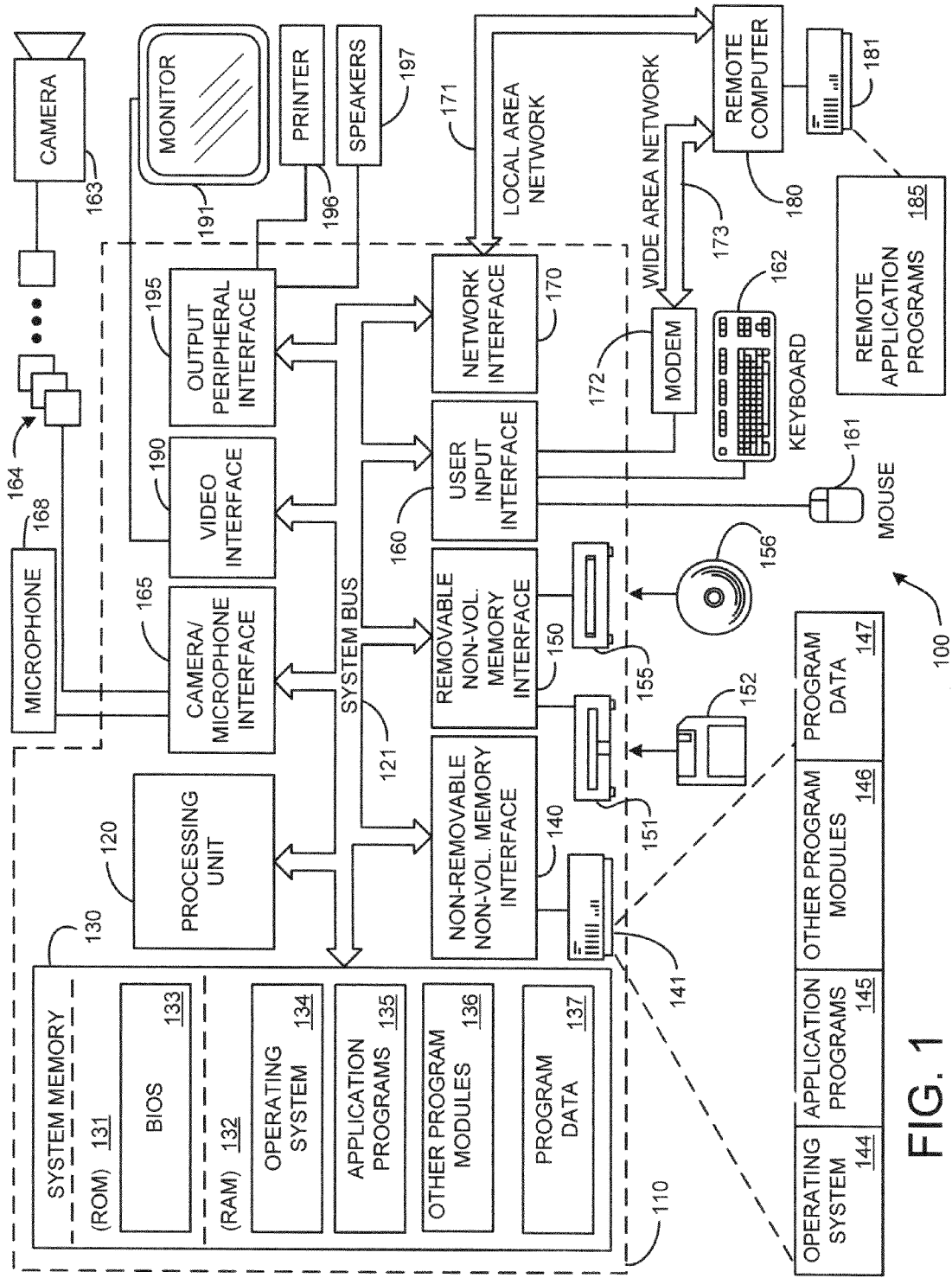
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. A microphone 168 may also be associated with the camera and input into the computer 110 with an interface 165 that is associated with one or more cameras. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Distributed Meetings.

The following sections describe the hardware equipment and software modules employed in the system. A typical scenario for how the DM system is envisioned in being used is also described.

2.2 General Overview.

Figure 2:
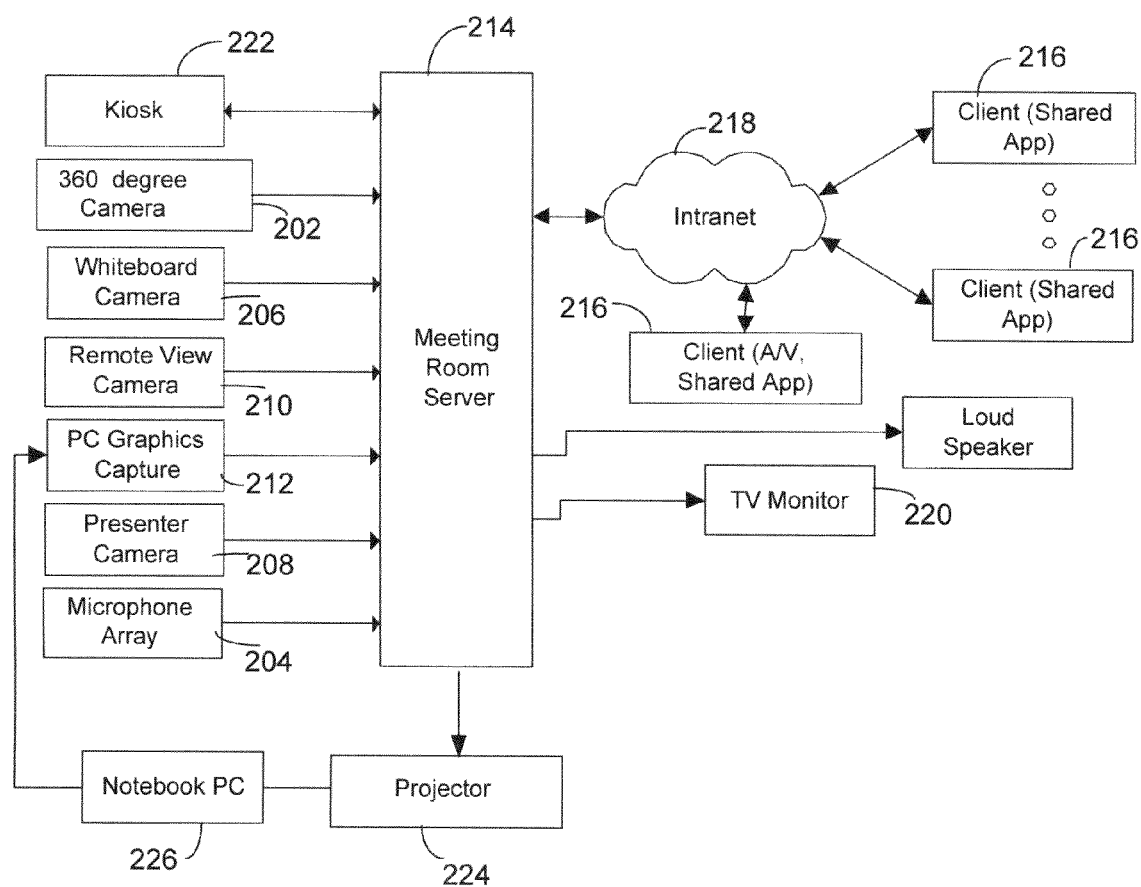
FIG. 2 depicts a diagram of one exemplary embodiment of the DM architecture. Meetings are captured and broadcasted by a meeting room server, and stored for offline access.
Figure 3:
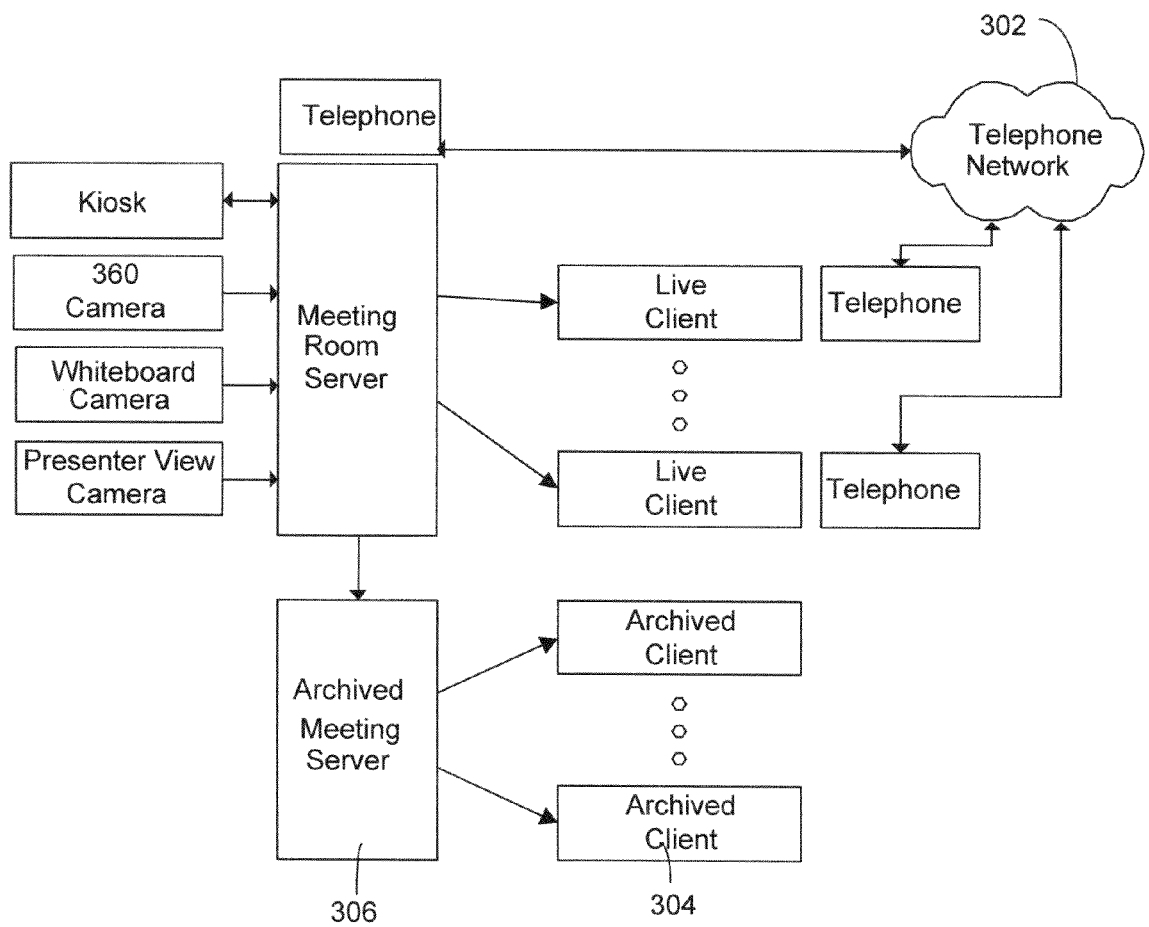
FIG. 3 depicts an alternate embodiment of the DM architecture. This embodiment uses the public phone system to connect remote clients.

An overview of one embodiment of the Distributed Meeting (DM) system is shown in FIG. 2. The DM system is a real-time communication (RTC) and recording system for meetings. It uses advanced hardware capture technology (a 3600 camera 202, an omni-directional microphone array 204, an image-based whiteboard capture camera 206, a presenter view camera 208, a remote view camera 210, and a PC graphics capture device (PCG) 212 such as a PC screen frame grabber) and advanced software processing (e.g., audio/visual (A/V) speaker detection, virtual directors, speaker indexing, whiteboard and PC screen indexing, time compression, beam-forming, echo cancellation/noise reduction/auto gain control, as well as sophisticated meeting analysis tools), to provide a rich conferencing and meeting recording experience. A meeting room server 214 performs the processing required to broadcast the meeting to one or more local or remote clients 216 via a network 218. The meeting room server 214 can also record the meetings. In one embodiment of the invention, however, a CPU is built into the 360-degree camera, and the meeting room server functions are performed by the built-in CPU. In this configuration the meeting room server 214 is not necessary. A TV/Monitor 220 may be used to display one or more remote participants. The DM system may include a workstation 222 that is used to setup, start, and stop a meeting. A projector 224 may be used for shared applications and presentations given from a notebook PC 226. FIG. 3 depicts an alternate embodiment of the DM architecture. This embodiment also uses the public phone system 302 to connect remote clients 304 and includes an archive meeting server 306.

The DM system integrates with electronic mail and scheduling software to provide meeting scheduling and a central location to retrieve a recorded meeting and related documents. The DM system also integrates with a Tablet PC to synchronize personal notes with a recorded meeting. Microsoft's® Tablet PC is a design for a fully-equipped personal computer that allows a user to take notes using natural handwriting on a stylus or digital pen-sensitive touch screen instead of requiring the use of a keyboard.

Figure 4:
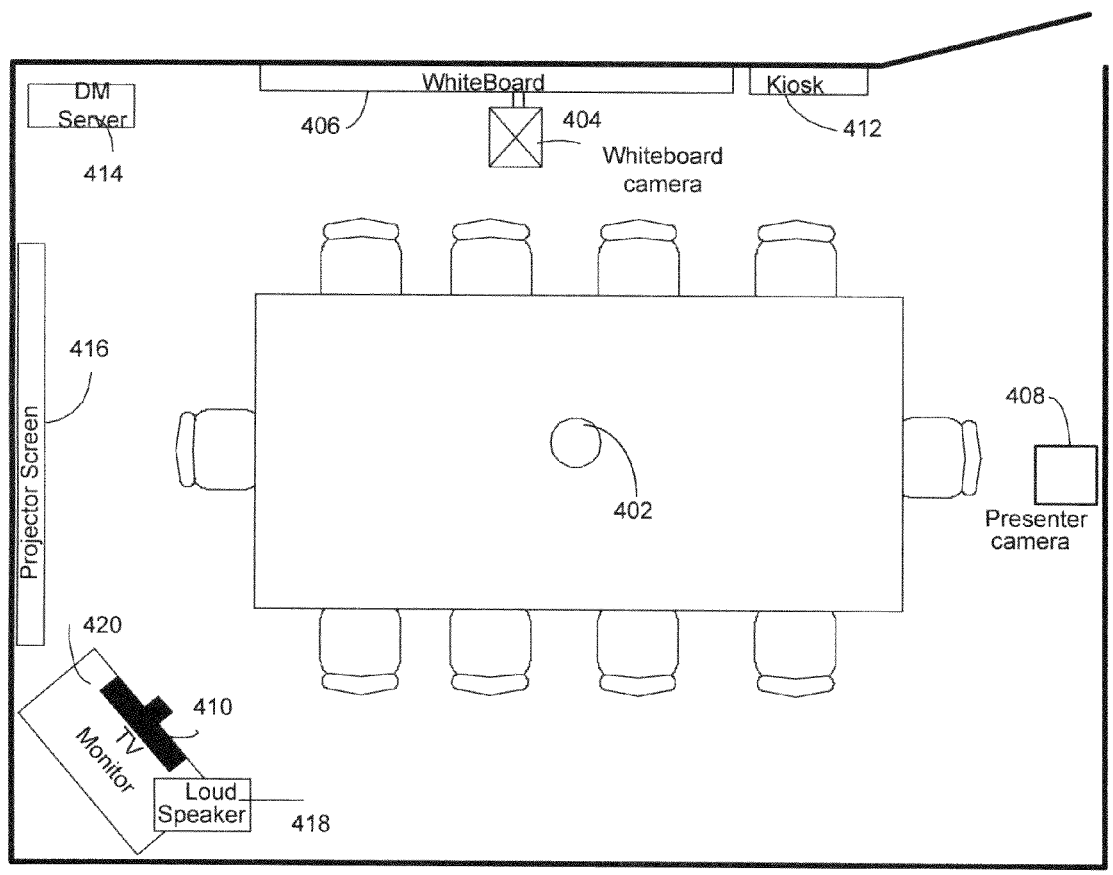
FIG. 4 depicts a typical DM room diagram. The room contains a 360-degree camera, whiteboard camera, presenter view camera, remote view camera, meeting room server and a kiosk, among other things.

An exemplary room layout configured with the DM system is shown in FIG. 4. The primary hardware used in a distributed meeting room typically consists of: a 360-degree camera 402 with an integrated omni-directional microphone array; a whiteboard capture camera 404 capturing what is written on a whiteboard 406; a presenter view camera 408 that captures a good camera view of the presenter and the front of the meeting room; a remote view camera 410 that captures images of the local meeting participants to be displayed to the remote client(s); a workstation/kiosk 412 with a touch screen display and keyboard; a meeting room server 414; a projector screen 416; a keycard reader (optional); a loud speaker 418; a TV/monitor 420, and a graphics capture device (not shown). All of the captured data streams are synchronized and can be integrated to enhance the real-time meeting and playback experience. Additionally, the data capture devices can be used in various configurations. That is, all data capture devices do not have to be available or operational at the same time. The hardware and software components of the DM system are described in the paragraphs below.

2.2 Hardware Overview 2.2.1 360-Degree Camera

A 360-degree camera, which can be integrated with a microphone array, is part of the system. A 360-degree camera placed in the center of a meeting table generally provides a better viewpoint of the meeting participants than a camera placed in the corner or side of the room. By capturing a high-resolution panoramic image, any of the meeting participants can be viewed simultaneously, which is a distinct advantage over traditional Pan Tilt Zoom (PTZ) cameras. Additionally, since the omni-directional camera has full coverage of the meeting room, an infinite number of camera views are available for presentation to a remote client or for other purposes. Although any conventional omni-directional camera can be employed with the DM system, one embodiment of the system uses a 360-degree camera made up of five cameras arranged in a back-to-back fashion to provide 360-degree coverage of the meeting room. Using such a camera for meeting viewing is described in a publication by Y. Rui, A. Gupta, and J. J. Cadiz [1].

In another embodiment of the DM system, a CPU is built into the 360-degree camera. This CPU performs most of the functions of the meeting room server in this embodiment which are discussed later in Section 2.4.1. In this embodiment, no meeting room server is required.

2.2.2 Microphone Array

In one embodiment of the DM system, instead of using several directional microphones with complex construction to provide 360° acoustic capture, a microphone array with omni-directional microphones is used to provide 360-degree coverage. This microphone array may be integrated with the 360-degree camera. This solution allows the system to capture the audio signal from around the meeting room, use sound source localization to find the direction of the speaker, and utilize beam-forming to enhance the sound quality recorded by the DM. The DM system can thus use both audio-based SSL and vision-based people tracking to detect speakers, which results in higher accuracy. Other conventional microphone configurations could also be used to correspond with the 360-degree camera, however, omni-directional configurations are preferred.

2.2.3 Whiteboard Camera

The DM system uses a conventional camera to capture an image sequence of the whiteboard. By analyzing the image sequence, time stamps of the strokes and key frames that summarize the key points of the contents written on the whiteboard can be automatically computed. A process by which such whiteboard capture data can be analyzed to provide key frames is described in Microsoft® Corporation's Technical Report MSR-TR-2002-89 [2]. However, any conventional method of providing such key frames can be used.

2.2.4 Remote View Camera

The remote view camera is positioned so as to capture a stream of images of the participants of the meeting in the meeting room and provide them to the remote clients. The remote view camera can be any conventional camera configuration. The remote view camera can also be integrated with its own separate microphone. In one embodiment of the invention, a digital PTZ camera is used.

2.2.5 Presenter View Camera

The presenter view camera is used to provide a view of the entire meeting room, but especially the front of the meeting room where a presenter would typically be making a formal presentation or writing on a whiteboard. It can be used by meeting viewers, and also be used to automatically detect events such as a person entering or exiting the room, or a person pointing to the whiteboard. Any conventional camera can be used as the presenter view camera. The presenter view camera can also be integrated with its own microphone to more clearly capture the audio from the presenter.

2.2.6 Meeting Room Server

The meeting room server performs the processing required to broadcast and record meetings. In one embodiment of the invention, the meeting room server runs on the workstation that is in the meeting room. The meeting room server could, however, be located in a different room. Additionally, in one embodiment of the DM system, the meeting room server can be configured to process more than one meeting that is being conducted and recorded simultaneously.

2.2.7 Archive Meeting Server

In one embodiment of the invention, an archive meeting server interfaces with archived clients via a network and stores the archived meetings. In another embodiment of the DM system and method, the functions of the archive meeting server are performed by the meeting room server. In this embodiment, only one server is employed by the DM system, as a separate meeting room server and archive meeting server are not necessary.

2.2.8 Projector and Projection Screen

A projector is used to display shared applications and presentations given from notebook PCs on a projector screen. It can also be used to show remote participants, display local data, and display a mix of both local and remote data.

2.2.9 TV/Monitor

A TV or monitor is used to display any remote participants to the participants in the meeting room. The TV or monitor can also be is used to display shared applications and presentations given from notebook PCs. Like the projector and projector screen, the TV/monitor can also be used to show remote participants, display local data, and display a mix of both local and remote data.

2.2.10 Kiosk

In one embodiment of the invention, the kiosk runs on a PC workstation and is used to setup, start and stop a meeting using the DM system. More data on the UI and functions of the kiosk are provided in the software section below.

2.2.11 Loudspeaker

The loudspeaker in the meeting room is used to play the audio from any remote participants to the participants in the meeting room.

2.2.12 Graphics Capture Device

Various graphics capture devices can be used with the DM system to capture and stream data such as presentations and other documents. Graphics capture can occur in a number of ways. For instance, when a PC is used to project a presentation to a screen or other smart display, this data can be captured and archived. Alternately, an analog capture device, such as a frame grabber can be used. Typically this provides high-resolution frame capture (e.g., 640×480 to 1600×1200) at various frame rates (e.g., 1-30 FPS). Yet another option is utilizing a PC with a screen scraper installed that captures the content of the screen of the PC and sends it to the meeting room server.

2.3 Software Overview

The major DM system software components are a DM meeting room server module; a DM post processor module; a DM meeting client module; a DM archive server module; a DM shared application module; a camera calibration module and a permission module. The following paragraphs describe these modules.

In one embodiment of the DM system, the meeting room server module is an application that runs on the meeting room workstation and acquires audio/video; compresses and archives the audio/video, and provides a duplex audio/video to a remote client over a network or phone line. Once the meeting is recorded, the DM system post processor processes the recorded meeting to detect key frames and perform whiteboard pen stroke analysis and speaker clustering. The DM system client is an application that runs on remote clients and allows viewing live conferences and archived meetings. The DM archive server is an application that runs on the meeting room workstation or a separate server and streams archived meetings to remote participants. The DM shared application module is an application that runs on local meeting room notebook computers used to share other applications with the DM meeting room server and other clients connected to the DM meeting room server. The camera calibration module is a 360-degree camera color calibration and image stitching module used in the calibration of the 360-degree camera. The viewing permissions of a recorded meeting are managed by the permission module.

2.4.1 DM Meeting Room Server

Figure 5:
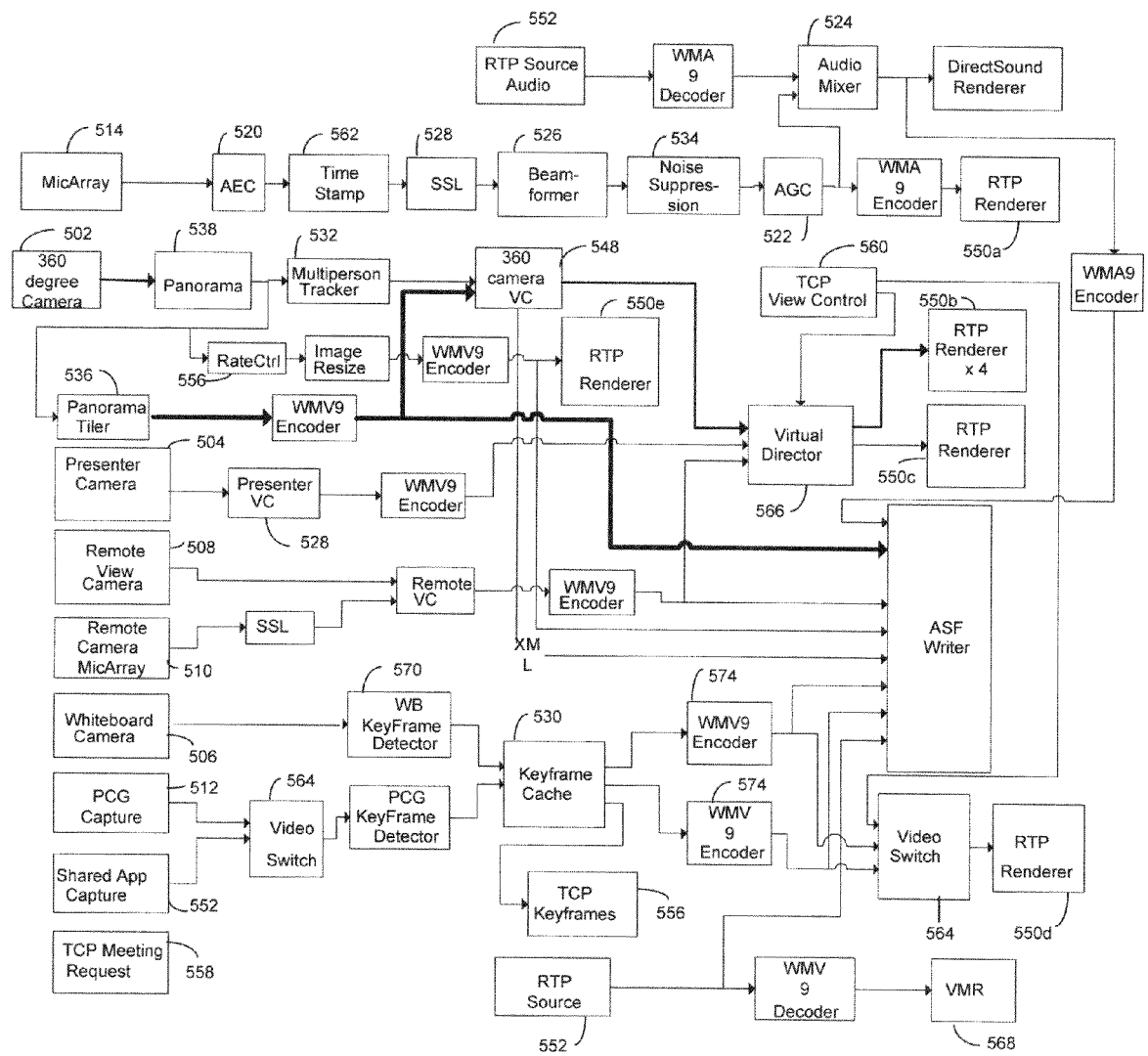
FIG. 5 depicts the dataflow of the meeting room server of an exemplary embodiment of the DM system and method according to the invention.

The meeting room server software performs the processing required to broadcast and record meetings. The DM meeting room server software runs on the meeting room server. It typically acquires captured audio/video; compresses and archives the audio/video, and provides a duplex audio/video to a remote client. A data flow of one embodiment of the meeting room server processing is shown in FIG. 5. The input devices are the 360-degree camera 502, presenter view camera 504, whiteboard camera 506, remote view camera 508 and associated microphone 510, graphics capture device 512 omni-directional microphone array 514 and keyboard/mouse of the workstation (not shown). The system is easily scalable and configurable to use any combination of these input devices, but should include a microphone array for audio input.

In one embodiment of the invention, the output devices of the DM meeting room server include the kiosk running on the workstation or meeting room server that is used to setup, start, and stop a meeting; a TV/monitor that displays one or more remote participant; a projector used for shared applications and presentations give from notebook PCs; and audio/video synchronization.

In another embodiment of the invention, much of the processing that the meeting room server performs is performed by a computer that is integrated with the 360-degree camera. For instance, the audio and real-time communications (RTC) processing are conducted by the computer integrated with the 360-degree camera. In this configuration, the 360-degree camera performs the stitching and tracking function. This embodiment is advantageous in that it has lower video and audio latency since this processing is done locally at the 360-degree camera.

As far as meeting capture, the following data streams are recorded: 360-degree camera panorama, remote view camera, presenter view camera, whiteboard camera, PC graphics capture (PCG), audio, and remote participant video. The streams are preferably recorded in compressed format, using conventional audio/video codecs. A remote client is able to connect to the meeting server to view any recorded meeting they have data access permission for. It is preferred that the network data rates for synchronous and asynchronous meetings are the same. The recorded data streams are saved, preferably in ASF file format (though any file format could be used). The recorded meetings also support data access permissions via Digital Rights Management as well has operating system file system permissions. Meeting participants (entered at the kiosk) have permission to view the meeting, but only the meeting owners have permission to grant others permission or delete the meeting.

As far as real-time communications (RTC) one or more remote RTC clients can be supported. The network transport streams (for the remote clients) include a speaker view, 360-degree camera panorama, whiteboard or graphics capture and audio. The speaker view is either automatically or manually selected from the 360-degree camera panorama, remote view camera, or presenter view camera. When done automatically, this is handled by the virtual director. The streams are compressed using conventional compression techniques. The streams prioritize audio over video, so that if the network connection becomes degraded, video quality degrades before audio quality.

Figure 6:
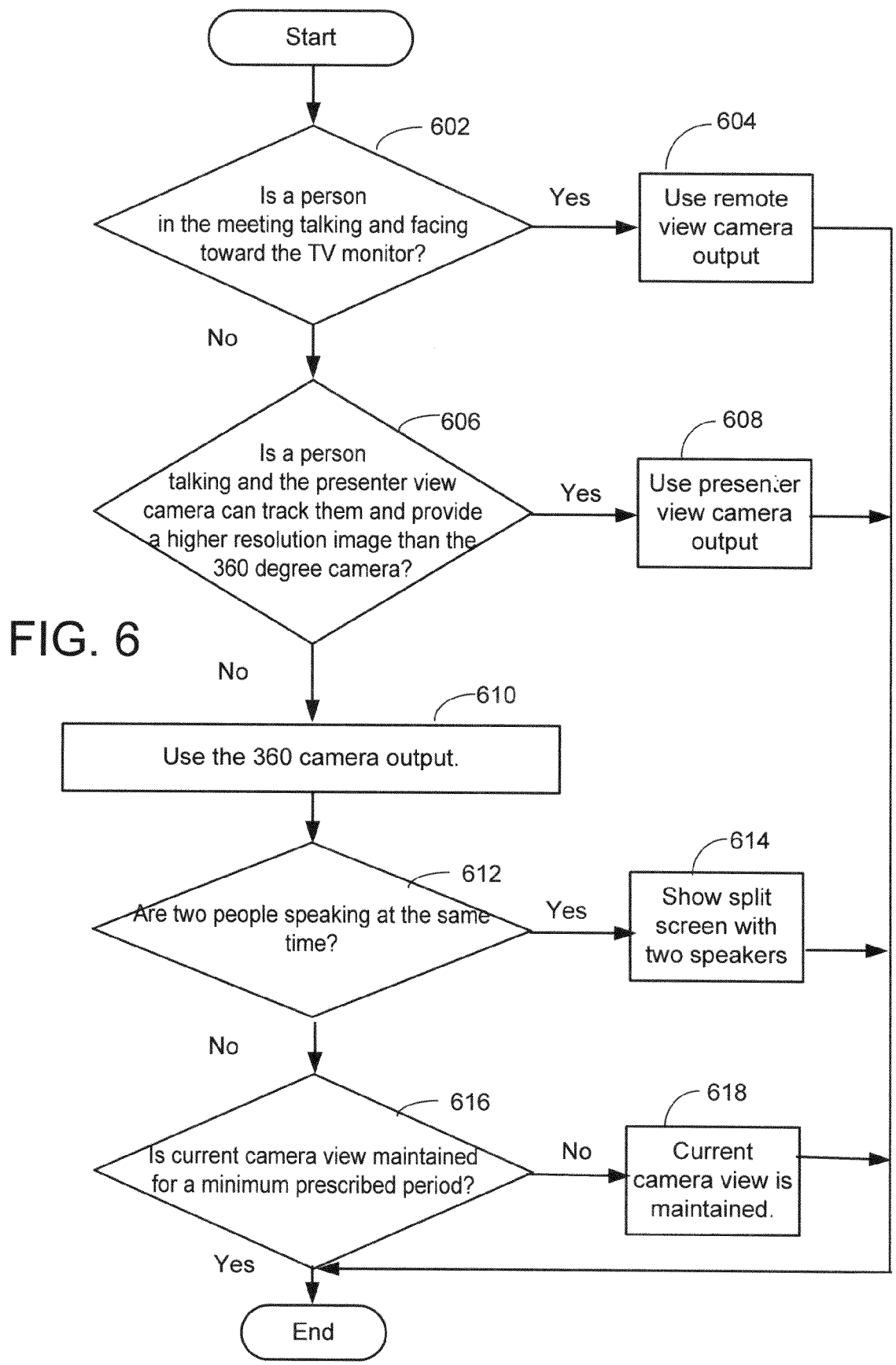
FIG. 6 is a flow diagram that depicts the simplified process actions of the Virtual Director in determining the best viewpoint from the output of the 360-degree camera, remote view camera, or presenter view camera to display.

The 360-degree camera, remote view camera, and presenter view camera may have a virtual cameraman (VC), which can detect the current speaker and provide a cropped view of the speaker. In one embodiment of the invention a virtual director (VD) provides the best viewpoint from the output of the 360-degree camera, remote view camera, and presenter view camera. Generally, as shown in FIG. 6, the simplified rules used by the virtual director in this embodiment are, if someone in the meeting room is talking and facing toward the TV/monitor, the VD uses the remote view camera output (process actions 602 and 604). If someone is talking and the presenter camera can track them and provide a higher resolution head shot than the 360-degree camera, then the VD uses the presenter VC output (process actions 606 and 608). Otherwise the VD uses the 360-degree camera output (process action 610). As shown in process actions 612 and 614, if two people are talking at the same time, instead of switching between these two speakers, the VD can decide to show them together side by side in a split screen (note that the DM system captures the entire 360° view). Another rule that is followed is that the camera should not switch too often (process actions 616 and 618); otherwise it may distract viewers.

The meeting room server provides the client an updated list of graphics capture and whiteboard key frames, even when the client logs in late into the meeting. Shared applications are supported. The shared applications can be run on the client's PC and are displayed on the projector output via the DM server.

The detailed dataflow diagram for the Distributed Meeting Server software for one embodiment of the invention is shown in FIG. 5. A general description of various portions of this data flow are described below.

The 360-degree microphone array 514, captures audio data which is then input into an AEC module 520. The AEC module 520 performs acoustic echo cancellation on the captured audio. This data is input into a timestamp module 462 which timestamps the audio if the data is not already validly time stamped. The timestamp is the sample time of the first sample in the audio sample, with respect to the system clock. The timestamps generated are based on the microphone array's actual starting time (with respect to the system clock), estimating the sample clock (e.g., using a simple running average) and counting the total number of samples passed through this filter. Note that the starting time between video and audio devices can differ significantly (>100 ms), and if good audio/video (A/V) sync is to be achieved, the audio timestamps need to be as accurate to system clock as possible. The system clock should be the master clock. The time stamped audio in then input into a sound source localization module 528. The sound source localizer 528 uses the microphone array to determine the angle of the sound source. The output is a data stream which encodes the sound source angle (preferably in XML format). The beam former module 526 then uses the microphone array to enhance the audio signal to noise (S/N) of the speaker. The noise suppression module 534 provides stationary noise reduction, while the automatic gain control module 522 provides automatic gain control.

The 360-degree capture source filter 502 captures the input from the 360-degree camera. All images for a given frame interval are packed into a single wide image. The timestamp for each input sample from the 360-degree camera is the begin time for exposure, and is relative to the DM meeting room server clock or system clock. The 360-degree camera input is fed to a panorama module 538 that stitches the video images from the 360-degree camera into a panoramic image. The panoramic image video stream is fed into a multi-person tracker module 532, a rate control module 546, and a panorama tiler module 536. The rate control module 546 subsamples the video frames to achieve lower frame rates. The panorama tiler module 536 slices the panorama into 20 vertical tiles, each 18 degrees (though any number of tiles or angle could be used). The edges of each tile are preferably cross-blended with their neighbors using an invertible transformation (e.g., rotation). After the encoding, this transformation can be inverted, which significantly reduces the visibility of seams caused by the tiling. The multi-person tracker module 532 detects and tracks people in the panoramic video stream. These tracking results are output (preferably in an XLM stream) to a 360-degree camera virtual cameraman 548. The 360-degree camera virtual cameraman 548 uses the 360-degree Sound Source Localization and the Multi-person Tracker 532 inputs to detect the current speaker. The output is an image of the current speaker, subject to cinematographic rules such as "don't switch the speaker too often", or if two people are speaking at the same time, output a split screen video that shows both speakers.

The output of the presenter view camera 504 is fed into the presenter virtual cameraman 542. The presenter view camera's virtual cameraman 542 tracks the presenter using motion and shape and outputs a video stream of the head and torso. It essentially emulates a PTZ camera and person tracker with a fixed single high resolution camera; a smaller cropped view of the high resolution video is output of the virtual cameraman for the presenter view camera.

The output of the remote view camera 508 is input to the remote view camera virtual cameraman 528. This cameraman 528 uses the SSL from the remote view camera's microphone array and a face detection procedure to determine who is looking at the remote view camera (and therefore the remote participant) and speaking, and it outputs a video stream of that person.

The whiteboard camera 506 output is fed into a whiteboard key frame detector 570 which is whiteboard key frame detector and additionally a whiteboard image enhancer. All input frames are passed as output frames, and a key frame is marked. Likewise, the PC graphics capture module 512 is a frame grabber, used to capture images from a notebook or meeting room PC.

A shared application capture module 554 captures the screen of any shared applications that are running. The outputs from the PC graphics capture module 512 and the shared application capture module are alternately input into a PCG key frame detector module 540 via a video switch 564. The PCG key frame detector 540 detects key frames in the PCG capture streams. For electronic presentations, the key frames should correspond to the electronic slides. All input frames are passed as output frames, and a key frame is marked. The key frames from whiteboard capture and the PC graphics capture module is input into a key frame cache 530. The key frame cache 530 is a cache of whiteboard and graphics capture key frames. This cache is used to provide key frames to a late remote participant. The output of the key frame cache can also be input to a Transfer Control Protocol (TCP) (one of the main protocols in a TCP/IP network) key frames module 556. The TCP key frames module 556 provides the client a list of whiteboard and PCG key frames and thumbnails. The video switch 564 switches between the various input video streams The outputs of the 360-degree camera 502, the presenter view camera 504 and the remote view camera 508 are all eventually fed into a Virtual Director module 566 after the processing discussed above. The Virtual Director 566 uses the output from multiple virtual cameramans to detect the best speaker view and render it to the network via RTP filters 550a-e.

Various audio encoders 572, video encoders 574, and renderers 550 are used throughout the system to encode audio and video and render images to an appropriate device. The various data streams are recorded and saved. In one embodiment this was done via an ASF writer module.

Not shown in this dataflow are kiosk video renderers and the shared application mechanism.

Details of some of the software modules employed in the DM system and method according to the invention are provided in the paragraphs below.

2.4.1.1 Panorama Stitcher

The panorama stitcher takes a number of video stream inputs, one from each camera in the camera array, (in one embodiment five each at 320×240 pixels 15 FPS) from the 360-degree camera and outputs a single panorama image (in the aforementioned embodiment the image size is 1500×240; 3000×480 is possible in full resolution mode, but this requires additional computation). Since each camera of the 360-degree camera in one embodiment of DM system uses a wide field of view lens, the images have significant radial distortion. The radial distortion model used is this working embodiment is:

$$x_u = x_d + x_d \sum_{i=1}^{\infty} \kappa_i R_d^i;\ y_u = y_d + y_d \sum_{i=1}^{\infty} \kappa_i R_d^i$$

where the $\kappa$'s are the radial distortion parameters, $(x_u, y_u)$ is the theoretical undistorted image point, $(x_d, y_d)$ is the measured distorted image point, and $R_d = x_d^2 + y_d^2$.

A calibration pattern is used to determine the first 5 radial distortion parameters, and to correct for the radial distortion. The images are then transformed into cylindrical coordinates, and the translation and scaling between each pair of adjacent cameras is determined. The cylindrical mappings are then combined to form a panoramic image, cross-fading of the overlapping regions improves the panoramic image quality. The images are corrected for vignetting and color calibrated to further enhance the panoramic image quality. All of these operations (radial distortion correction, cylindrical mapping, panoramic construction, cross-fading, devignetting) can be combined into a single image remapping function for computational efficiency. An example of such a color calibration process is the subject of a publication by H. Nanda and R. Cutler [3]. Additionally, a stitching process that could be used in stitching the images captured by the omni-directional camera is described in a publication by R. Szeliski and H.-Y. Shum [4].

2.4.1.2 Sound Source Localization

In the DM context, the goal for sound source localization (SSL) is to detect which meeting participant is talking. The sound source direction can be used for refining the camera view captured and presented to a remote client. There are many conventional methods of performing SSL, many of which can be employed by the DM system and method according to the invention.

2.4.1.3 Person Detection and Tracking

Although audio-based SSL can detect who is talking, its spatial resolution is not high enough to finely steer a virtual camera view. In addition, occasionally it can lose track due to room noise, reverberation, or multiple people speaking at the same time. Vision-based person tracking is a natural complement to SSL. Though it does not know who is talking, it has a higher spatial resolution and can track multiple people at the same time.

1. Various conventional person detection and tracking systems can be used in combination with the audio-based SSL to finely steer the view of the 360-degree camera to display the person or people that are speaking. However, after careful evaluation of existing techniques, a fully automatic tracking system was implemented by integrating three important modules: auto-initialization, multi-cue tracking and hierarchical verification.

2. Auto-initialization: Three different ways are used to achieve auto-initialization. When there is motion in the video, the frame difference is used to decide if there are regions in the frame that resemble head-and-shoulder profiles. When there is audio, SSL is used to initialize the tracker. When neither motion nor audio is available, a state-of-the-art fast multi-view face detector is used to initialize the tracker. An example of such a multi-view face detector is the subject of a co-pending application entitled "A System and Method For Multi-View Face Detection", which is assigned to a common assignee. The co-pending application was filed on Mar. 4, 2002 and assigned Ser. No. 10/091,100.

3. Hierarchical Verification: No vision-based tracker can reliably track objects all the time. Each tracked object therefore needs to be verified to see if the tracker has lost track. To achieve real-time performance, a hierarchical verification module was developed. At the lower level it uses the object's internal color property (e.g., color histogram in HSV color space) to conduct a faster but less accurate verification. If a tracked object does not pass the low-level verification, it will go through a slower but more accurate high-level verification. If it fails again, the tracking system will discard this object.

4. Multi-Cue Tracking: Because of background clutter, single visual tracking cues are not robust enough individually. To overcome this difficulty, an effective multi-cue tracker based on hidden Markov models (HMM) was developed. By expanding the HMM's observation vector, one can probabilistically incorporate multiple tracking cues (e.g., contour edge likelihood, foreground/background color) and spatial constraints (e.g., object shape and contour smoothness constraints) into the tracking system.

Working together, these three modules achieve good tracking performance in real-world environment. An example of such a tracking system is the subject of a co-pending application entitled "Automatic Detection and Tracking of Multiple Individuals Using Multiple Cues", which is assigned to a common assignee. The co-pending application was filed on Dec. 3, 2001 and assigned Ser. No. 10/006,927. This application was published on Jun. 5, 2003 as U.S. Publication No. 20030103647.

2.4.1.4 Beamforming

High quality audio is a critical component for remote participants. To improve the audio quality, beamforming and noise removal are used. Microphone array beamforming is a technique used to "aim" the microphone array in an arbitrary direction to enhance the S/N in that direction. Any conventional method of beamforming can be used with the DM system and method according to the invention. For computational efficiency and low latency (compared to adaptive filters), a delay and sum beamformer is used. [5] The beamformer also helps dereverberate the audio, which significantly improves the audio quality.

2.4.1.5 Noise Reduction and Automatic Gain Control (AGC).

Any conventional noise reduction and AGC could be used with the DM system. However, in one working embodiment of the DM system, the audio signal is band filtered to [100, 8000] Hz to remove non-speech frequencies, and a noise reduction filter removes stationary background noise (e.g., noise from projector fan and air conditioners). The gain is automatically adjusted so that speakers sitting close to the 360-degree camera have similar amplitudes to those sitting further away. An exemplary noise reduction technique that can be used with the DM system is found in a report by W. Jiang and H. Malvar [6].

2.4.1.6 Virtual Cameraman.

A virtual cameraman can be used to control what a given camera captures by determining which camera view to obtain and how to track the subject of interest if it is moving. A virtual cameraman will use a given set of rules to decide which view a camera should obtain. The virtual cameraman is also able to provide a split screen if necessary to provide more than one view at a time.

2.4.1.7 Virtual Director

Figure 7:
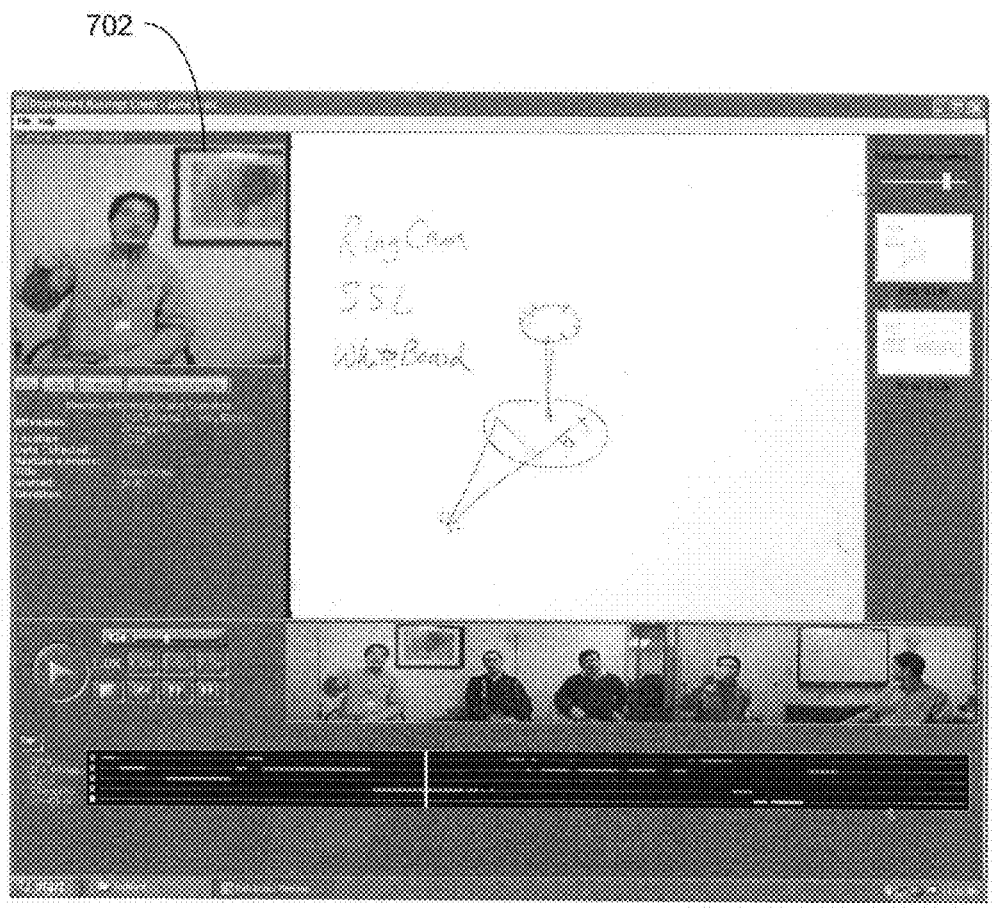
FIG. 7 is an exemplary user interface of an exemplary embodiment of the DM system and method according to the invention.

The responsibility of the virtual director (VD) module is to gather and analyze reports from the SSL and multi-person tracker and make intelligent decisions on what the speaker window (the top left window 702 in FIG. 7) should show. Just like video directors in real life, a good VD module observes the rules of the cinematography and video editing in order to make the recording more informative and entertaining. For example, when a person is talking, the VD should promptly show that person. If two people are talking back and forth, instead of switching between these two speakers, the VD may decide to show them together side by side (note that the DM system captures the entire 360° view). Another important rule to follow is that the camera should not switch too often; otherwise it may distract viewers.

The virtual director also can include other video sources, such as the presenter view window (e.g., show the presenter view window when someone enters/exist the room), and can show multiple people in the speaker window (e.g., when two people are talking quickly back and forth). An example of a virtual director that can be used in the DM system according to the invention is described in more detail in a publication by Q. Liu, Y. Rui, A. Gupta and J. J. Cadiz entitled "Automating Camera Management for Lecture Room Environments". [7]

2.4.1.8 Real Time Protocol (RTP).

In one working embodiment of the DM system and method, all multimedia streams are transmitted (multicast) to live remote clients via the Real-Time-Protocol.

2.4.1.9 Whiteboard Processing

In one embodiment of the DM system and method, for live broadcasting, the whiteboard images are white-balanced, cropped and a bilinear warp is used correct for a non-frontal camera viewpoint. The images are then recompressed and broadcasted to the remote participants. All of these tasks can be performed via conventional methods.

For archived meetings, offline image analysis is performed to detect the creation time for each pen strokes. Further analysis is performed to detect key frames, which are defined as the whiteboard image just before a major erasure happens. An example of such a whiteboard analysis system and method is the subject of Microsoft® Corporation's Technical Report MSR-TR-2002-89 [2]. This system captures both whiteboard content and audio signals using a digital still camera and a microphone. It can be retrofit to fit any existing whiteboard. It computes the time stamps of pen strokes on the whiteboard by analyzing the sequence of captured snapshots. It also automatically produces a set of key frames representing all the written content on the whiteboard before each erasure. Since the whiteboard content and audio are synchronized, the whiteboard content serves as a visual index to efficiently browse the audio of the meeting.

2.4.1.10 Speaker Segmentation and Clustering

For archived meetings, an important value-added feature is speaker clustering. If a timeline can be generated showing when each person talked during the meeting, it can allow users to jump between interesting points, listen to a particular participant, and better understand the dynamics of the meeting. The input to this preprocessing module is the output from the SSL, and the output from this module is the timeline clusters. There are two components in this system: pre-filtering and clustering. During pre-filtering, the noisy SSL output will be filtered and outliers thrown away. During clustering, K-mean's clustering is used during the first a few iterations to bootstrap, and a mixtures of Gaussians clustering is then used to refine the result. Both K mean and mixture of Gaussian clustering are conventional segmentation/clustering techniques.

2.4.11 Meeting Time Compression.

The DM system and method includes a time compression feature that allows the meeting to be played back in a time-compressed manner. The actual time compression of the recorded audio is performed via conventional methods, typically be simply compressing the audio signal. Video that is associated with the compressed audio is synchronized with the time-compressed audio by appropriately speeding up or slowing down the frame rate of the video stream. The time compression feature can be applied to individual speakers also. It is useful in speeding up slow speakers and slowing down fast speakers or those that are in other ways difficult to understand. A speaker fast forward function is also available to skip parts of what an individual speaker is saying. A method of audio/video time compression that can be used with the DM system and method is described by He and Gupta. [8]

2.4.12 Meeting Catch Up Mode.

Meeting catch up mode allows a late meeting participant to "catch up" in the meeting. There are various methods in the DM system and method by which a meeting participant can catch up. In one case, meeting catch up is achieved by allowing the late meeting participant to access key frames that are detected in the whiteboard and graphics capture device data streams. To "catch up" in the meeting the participant can review the key frames by, for example, selecting and scrolling through thumbnails of each key frame and reviewing the contents of each key frame. Alternately, the late meeting participant can use time compression to view the meeting, starting at the beginning. Due to this time compression feature, the late participant can start viewing the meeting from the beginning in this manner and eventually "catch-up" to the current meeting. Another option available to catch up in a meeting is to use speaker filtering. The speakers that the late meeting participant wants to hear can be filtered by selecting the desired speakers, so that playback will skip past all speakers not selected. In addition to these three methods of meeting catch up, the late meeting participant can also use any combination of the three.

2.4.13 Personal Note Software Synchronization.

The DM system also has a function whereby it synchronizes a user's personal electronic notes taken by a note-taking program with a recorded meeting. Typically an electronic note-taking program has time stamps that indicate when a given word was written. The DM server uses these time stamps to synchronize the personal note data with the recorded DM meeting data. In this embodiment, when a user clicks on a note taken at a given time, the DM client synchronizes the DM data to this point in time.

2.4.14 Meeting Indexing

The DM system uses various sophisticated methods of indexing the meeting content to improve the meeting playback experience. As discussed previously, the meeting is indexed via the use of key frames that summarize the key points in a meeting (e.g., the whiteboard content just prior to erasure).

Another way in which the meeting content is indexed is through the use of speaker identification. Speakers are identified via conventional spectral analysis and can be individually segmented for subsequent processing. This allows a user of the DM system and method to identify and select to hear only certain speakers, instead of the whole meeting.

The DM system also indexes meeting content is by key word indexing. Conventional automatic speech recognition is used to transcribe the audio portions of the meeting. Once the audio is transcribed, key word searches can be used to search the transcript and locate the desired content. Alternately, the audio can be transcribed in phonetic format and phonetic key word searches can be used to identify specific words in phonetic format.

Another manner by which the DM system indexes meeting content is by using a conventional tone of voice recognizer, such as a pitch recognizer. The meeting can then be indexed according to the tones of voice used in the meeting. This tool is useful in identifying when a heated conversation is taking place or exciting moments of the meeting occur.

Speaker turn rate (e.g., speakers/minute) is also used to index the meeting content in one embodiment of the system and method according to the invention. This is done by examining the audio streams of the meeting to identify the times when speakers are changing. It is assumed that the more interesting times in the meeting are when the speaker turn rate is high. These are the times that correspond to heated debate.

Another way of indexing is by using a privacy mode feature that exists in the DM system. Privacy mode allows user to turn the DM system on or off in order to privately discuss a given matter. For instance, when users turn the privacy mode on/off (to discuss items they do not want to be recorded or broadcasted to remote participants) these events of turning on and turning off privacy mode can be recorded. The recorded meeting data can be indexed by when the DM system recording/broadcasting was turned on or off.

It is also possible to index the meeting data by when people enter and exit the room, which can be determined using a multiperson tracker and the room geometry. For example, the multi-person tracker can be used to track when people enter and leave the room by a given door and this data can be used to create an index to the meeting data.

Alternately, it is possible to index the meeting data when a shared application is started or stopped. Other methods of indexing the meeting include indexing the meeting data when someone points to the whiteboard, or indexing that is associated with personal notes. As discussed previously, electronic personal notes taken on a computer with personal note-taking software can be synchronized with the DM meeting and used as an index. The notes could also include a meeting agenda and the user can use the agenda as an index.

2.4.2 Meeting Room Kiosk

The meeting room kiosk is used to setup, start, and stop the DM system. The meeting description and participants are automatically initialized using information gleaned from an associated electronic mail or scheduling server and any schedule information that known for that meeting room at that time. All entries can be modified and new users can be quickly added using the keycard reader attached to the system.

Figure 8A:
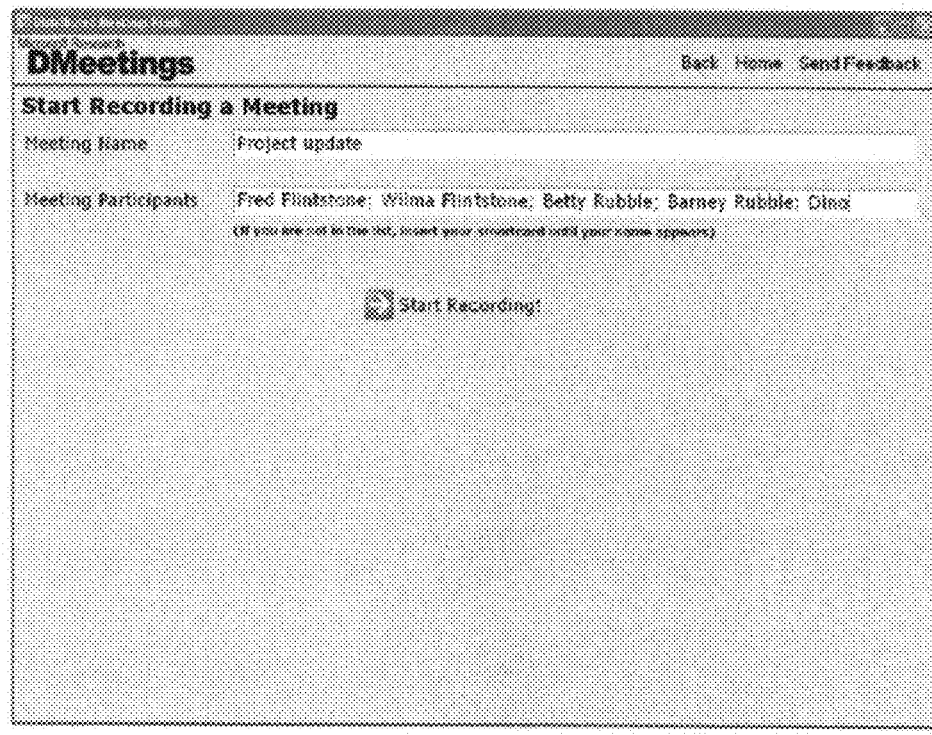
FIGS. 8A, 8B, 8C and 8D show the various displays of the DM kiosk's user interface. The DM kiosk is used to control the DM system in the meeting room.
Figure 8B:
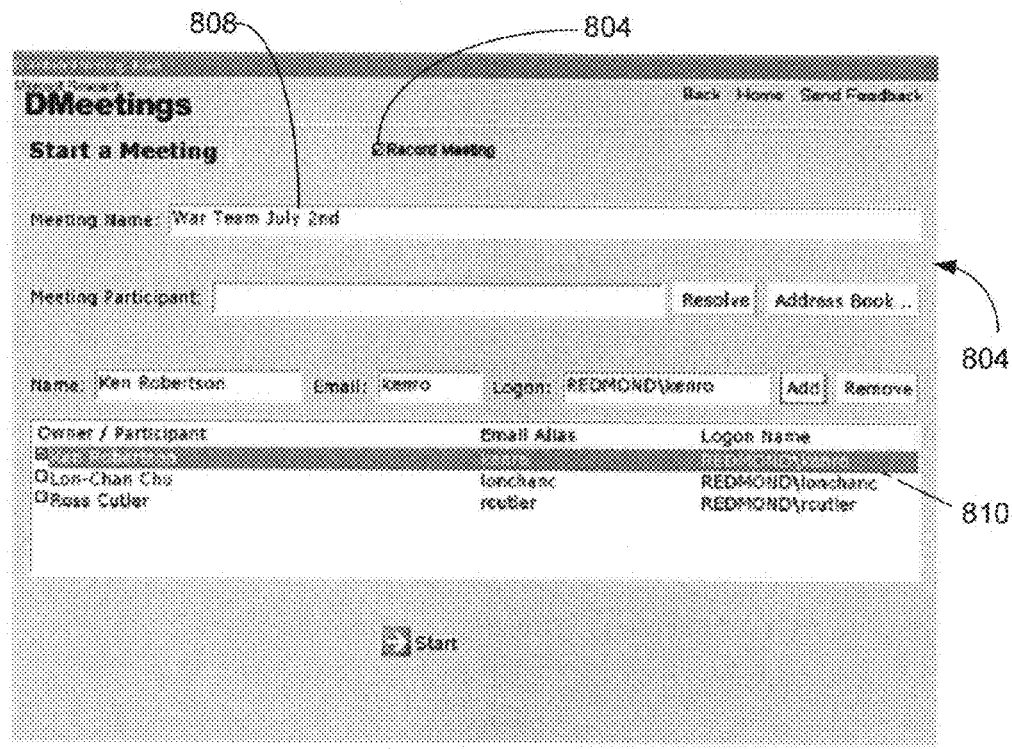
Figure 8C:
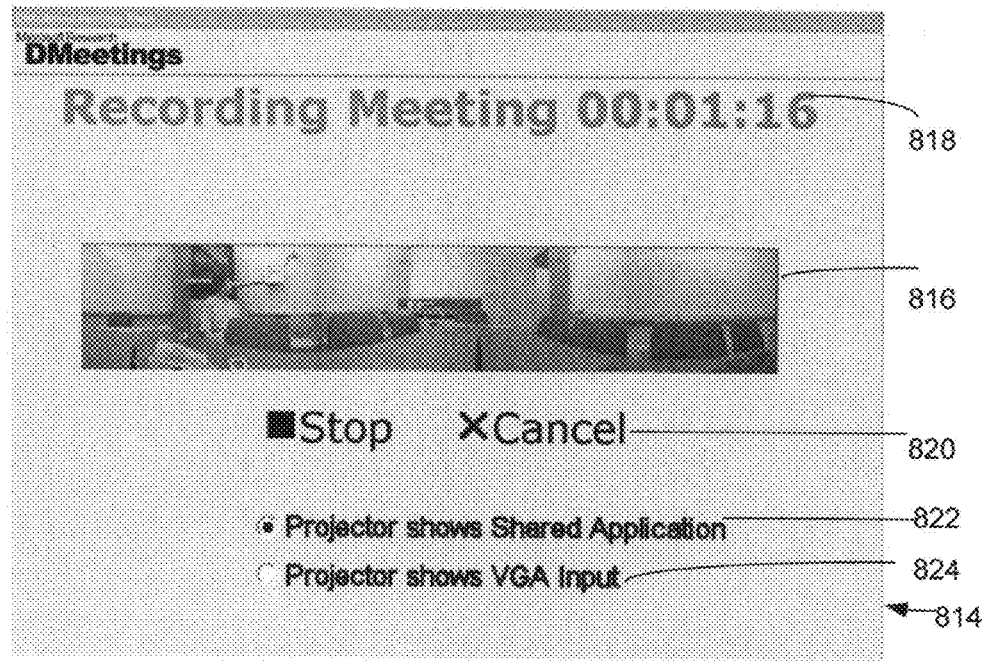
Figure 8D:
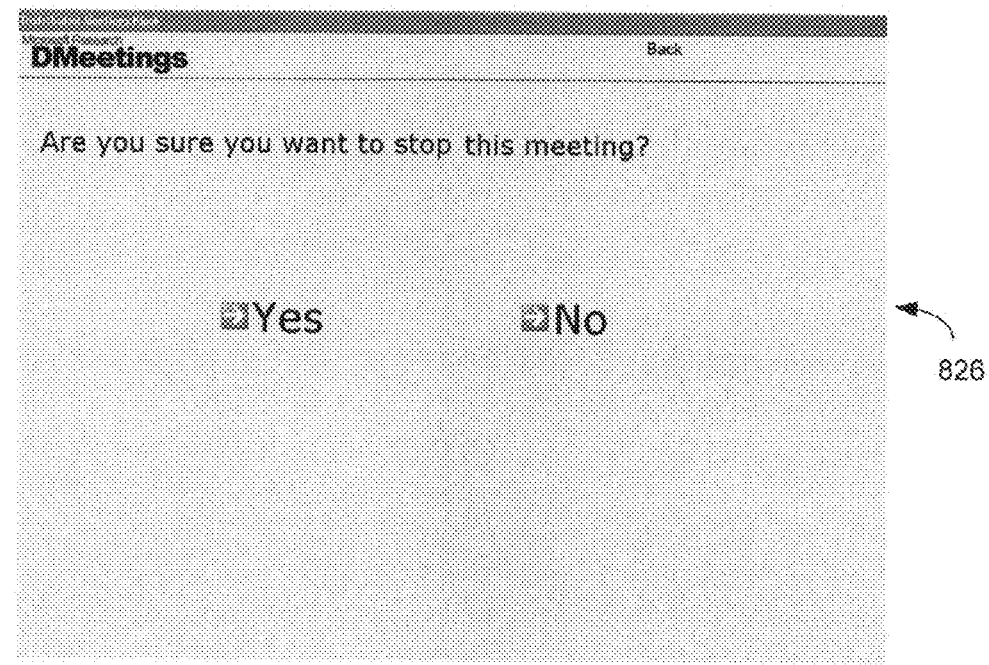

The kiosk has the following user interface screens: initial display (FIG. 8A); meeting setup (FIG. 8B); meeting status (FIG. 8C) and stop meeting (FIG. 8D).

FIG. 8A shows the initial display 802 of the meeting kiosk. This is the initial state of the kiosk. It allows the user to learn about the DM system and start a meeting. The meeting setup user interface 804, shown in FIG. 8B, allows the user to start a meeting. An option to record is available, selectable by the user by selecting the appropriate button 806. For recording a meeting, the meeting description 808 and participants 810 (those who will have access to the meeting) can be specified (and should be automatically extracted from the server). The meeting owners are also specified here. The default meeting owner in a previously scheduled meeting is the meeting organizer. To comply with some state laws on recording conversations, the participants of the meeting need to be informed that the meeting is being recorded. To facilitate this, the following UI is implemented for the kiosk in one working embodiment of the DM system: When the user presses "Start recording", a modal dialog box pops up that says: "You are about to begin recording the meeting. Please inform everyone in the room that the meeting will be recorded. If people walk into the room later, please make sure to let them know that the meeting is being recorded." When the user presses OK for the above legal dialog, the system plays an audio message "This meeting is now being recorded" on the kiosk speakers. This audio message should also be recorded in the meeting (e.g., the meeting recording needs to begin just before this message is played).

The meeting status display 814, shown in FIG. 8C displays the various video windows (panorama, speaker window, presenter view camera, remote view camera, whiteboard camera) and meeting duration. The meeting status display 814 allows the user to stop or cancel (delete the recorded) the meeting by selecting the appropriate box 820. The meeting status display 814 allows the user to set a VGA video switch so that the projector gets video from the DM Server (shared applications) 822 or VGA splitter (notebook PCs) 824. This user interface also allows the meeting participants to be modified.

The stop meeting display 826 verifies that the user wants to stop the meeting. See FIG. 8D.

In an alternate embodiment, an LCD display on the 360-degree camera can be used as the kiosk in a manner similar to that described above.

2.4.3 TV/Monitor

The TV/Monitor is used to display the remote participant. The user interface simply displays the remote participant full screen. Audio from the remote participant should be played from the TV/Monitor.

2.4.4 Distributed Meeting Post Processor

The DM post processor is a service which runs on the meeting room server. It is invoked by the DM meeting server software after a meeting is completed, and performs whiteboard analysis, speaker segmentation, and emailing to meeting participants of meeting related materials. The DM post processor computes timestamps for each pen stroke and key frame for the whiteboard images. Note that offline key frame computation should be more accurate than the live key frame detection, which is why it is done again. The DM post processor also computes the number of speakers and the times that they spoke during the meeting. The results are stored in a speaker file (e.g., speakers.xml). Additionally, the DM post processor sends email to the meeting participants with a URL to the recorded meeting, and sets up initializes the client setup file and data access permission.

For recorded meetings, meeting analysis includes human activities (such as when people enter/exit a room) and detect whiteboard pointing events (e.g., show not only when at equation was written on the whiteboard, but also when it was pointed to). One embodiment of the invention uses digital rights management (DRM) to provide security for the recorded meetings (e.g., this meeting can only be viewed by the participants, but cannot be copied), and to setup automatic retention policies for recorded meetings.

2.4.5 DM Archive Server

The DM archive server application streams recorded meetings to remote clients. The connections that it makes to the remote client are very similar to the live client. In one embodiment of the DM system, the differences are that the DM server provides arbitrary seeking (not just in the past), editing, and annotation.

The DM archive server provides archived meeting access to for up to N simultaneous remote clients. In one working embodiment of the DM system N was 5-10. The DM archive server supports various network transport streams to include:

speaker view, low resolution 360-degree camera panorama, whiteboard or PCG, audio, timeline events, meeting information, and key frames and associated thumbnails. The speaker view is either automatically or manually selected from the 360-degree camera panorama, remote view camera, or presenter view camera. When done automatically, the view is selected from the VD stream saved (e.g., in the meeting ASF file). When done manually, the view is selected by the client. The client can select to view the whiteboard or PG graphics board (e.g., via a TCP backchannel). The timeline events are preferably sent via a bidirectional TCP connection. The client can modify the timeline events by renaming speakers, merging speakers, and adding/editing/deleting annotations. The whiteboard and PCG key frames are also preferably sent via a bidirectional TCP connection. Both key frames and key frame thumbnails are available at the request of the client. At the beginning of a meeting, the client can request all of the thumbnails. The full size key frames will only be provided on-demand, and are used only for copying to the clipboard and saving to a file. The meeting information is also preferably sent via a TCP connection. All data streams are preferably compressed and are prioritized audio over video, so that if the network connection becomes degraded, video quality degrades before audio quality.

Figure 9:
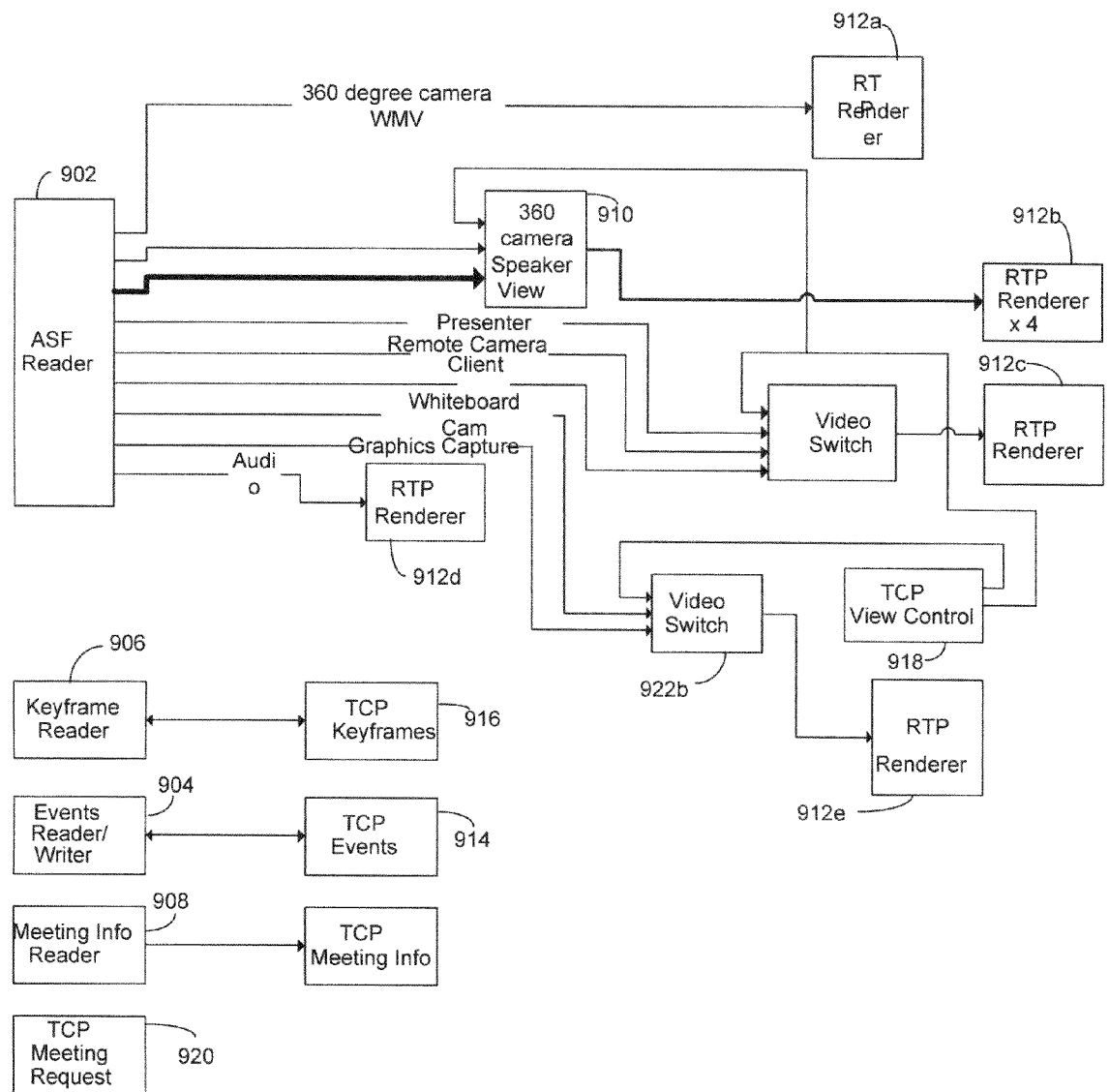
FIG. 9 depicts an archive server's dataflow of an exemplary embodiment of the DM system and method according to the invention.

The dataflow of one exemplary working embodiment of the archive server is shown in FIG. 9. The ASF reader module 902 reads the relevant data streams, such as from the presenter camera, the 360-degree camera, overview camera, client input, whiteboard capture, microphone array and graphics capture device. The 360-degree camera speaker view module selects the panorama video to provide the selected speaker view. The video inputs are the 20 panorama streams from the panorama tiler; the outputs are any 4 contiguous tiles which are stitched into a speaker view. Note than the speaker view should send the 360-degree camera, remote view, or presenter speaker view to the client. The RTP renderers 912 at various locations in the data flow render the desired data.

The key frame reader 906 reads the key frames at the request of the TCP key frames filter 916, while the events reader/writer 905 reads and writes timeline events. The TCP events module 914 communicates with the client to read and write timeline events. The meeting info reader 908 reads the meeting information data. The TCP view control 918 communicates with the client to determine which speaker view to and whiteboard/PC graphics capture/screen capture to display. The video switch 922a, 922b selects one of the N video inputs based on the input stream.

The TCP Meeting Request module 920 communicates with the client who can request an archived meeting. If the client has permission to view the requested meeting, then the meeting is streamed to the client.

2.4.6 Remote Client

Figure 10:
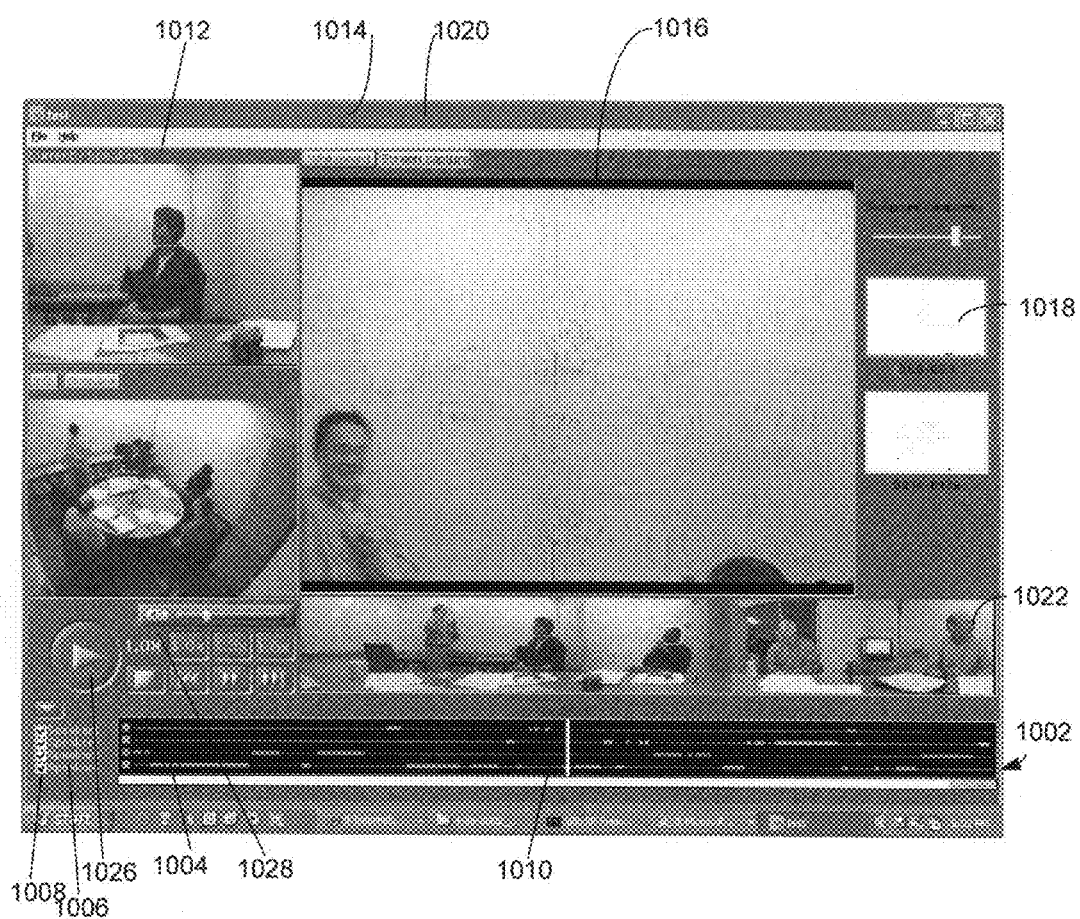
FIG. 10 shows the UI for a DM system archived meeting client of an exemplary embodiment of the DM system and method according to the invention. Shown are a panorama window (bottom), a speaker window (upper left), a whiteboard window (upper right), and a timeline (bottom).

The DM remote client supports both live and asynchronous viewing of meetings. An exemplary user interface for one working embodiment of the archived client is shown in FIG. 10. The UI consists of timeline control, speaker video, shared applications, annotations, panorama view, PCG video, meeting information and playback control. The user interface for the archived client is shown in FIG. 10. The live client is similar, but does not include the timeline or whiteboard key frame table of contents.

A low resolution version of the 360-degree camera 1022 panorama image is shown in the lower part of the client. The panorama view button displays video a low resolution version of the panorama 1022. A high resolution image of the speaker is shown in the upper left 1012, which can either be automatically selected by the virtual director or manually selected by the user (by clicking within the panoramic image). The speaker video window 1012 displays video one of the following cameras: 360-degree camera, remote view camera, or presenter camera. When the virtual director is enabled, the video showing the best viewpoint is enabled. When the virtual director is disabled, the user can select which video stream to select via a "360-degree camera", "remote view", or "Presentation" tabs (not shown). Clicking within the panorama when the virtual director is disabled displays the current speaker in the speaker view 1012.

The whiteboard image is shown in the upper right window 1016. Each pen stroke is time-stamped, and clicking on any stroke in the whiteboard synchronizes the meeting to the time when that stroke was created. Pen strokes that will be made in the future are displayed in light gray, while pen strokes in the past are shown in their full color. Key frames for the whiteboard are displayed to the right of the full whiteboard image and provide another index into the meeting. The transparency of the current key frame and the current image can be adjusted so that remote viewers can even view pen strokes occluded by a person. The whiteboard video button 1014 displays the whiteboard video 1016. Key frame thumbnails 1018 are displayed to the right in a scrollable list. The current key frame displayed is highlighted and scrolled to be displayed. In live mode, clicking on a key frame thumbnail 1018 displays that key frame, and the user can press a button "Display live video" (not shown) to return to displaying the live whiteboard video.

In an archived mode, with respect to the whiteboard UI, clicking on a key frame thumbnail synchronizes all audio and video streams to the time the key frame was captured. Clicking on any stroke in the whiteboard synchronizes the meeting to the time when that stroke was created. Pen strokes that will be made in the future are displayed in light gray, while pen strokes in the past are shown in their full color. The transparency of the current key frame and the current image can be adjusted so that remote viewers can even view pen strokes occluded by a person.

The same area on the screen that displays the whiteboard video 1016, can display the data that is capture by the PC capture device by selecting the screen capture button 1020. Like the whiteboard window, this area of the UI 1016, now the PC Graphics video window, displays the PC graphics video. Likewise, key frame thumbnails are displayed to the right in a scrollable list. The current key frame displayed is highlighted and scrolled to be displayed. In live mode, clicking on a key frame displays that key frame, and the user can press a button "Display live video" to return to displaying the live PCG video. In archived mode, clicking on a key frame synchronizes all audio and video streams to the time the key frame was captured.

The timeline 1010 is shown in the bottom of the window, which shows the results of speaker segmentation. The speakers are automatically segmented and assigned a unique color. The person IDs have been manually assigned, though this process could be automated by voice identification. The remote viewer can select which person to view by clicking on that person's color. The speakers can also be filtered, so that playback will skip past all speakers not selected. The timeline control window 1002 is shown in FIG. 10. The timeline 1004 displays the results of speaker segmentation. The speakers 1006 are automatically segmented and assigned a unique color. The default IDs (Speaker 1, Speaker 2, . . . ) can be easily edited. In addition, speakers can be merged (to fix segmentation errors). The remote viewer can select which person to view by clicking on that person's color. The speakers can be filtered using a checkbox 1008 next to each speaker, so that playback will skip past all speakers not selected. A separate line 1010 in the timeline displays events such as key frames, annotations, projector switch to PCG, projector switch to shared application, privacy mode on/off. Events are displayed with an icon on the timeline.

Annotations can be added by right-clicking on the timeline and selecting the Add Annotation menu item (not shown). Annotations can be added, deleted, and edited in this window. Annotations can be deleted by right-clicking on the timeline with a mouse cursor or other input device at the annotation to delete and selecting the Delete Annotation menu item. Annotations can be edited by right-clicking on the timeline at the annotation to edit and selecting the Edit Annotation menu item.

The playback control section 1028 to the left of the panorama allows the remote view to seek to the next or previous speaker during playback. In addition, time compression can be used to remove pauses to and increase the playback speed without changing the speaker's voice pitch. The playback control feature 1026 allows the user to seek to the next or previous speaker during playback. It allows setting of the time compression setting 1028 (1x, 1.3x, 1.6x) to remove pauses to and increase the playback speed without changing the speaker's voice pitch.

Just above the playback control is the tab control, which allows the user to display meeting information (time, location, duration, title, participants), meeting statistics (who led the meeting, number of active participants), the overview window, and whiteboard statistics.

The shared application button allows the user to share an application, which will be displayed on the conference room projector. The meeting information button displays meeting information (time, location, duration, title, participants).

Figure 11:
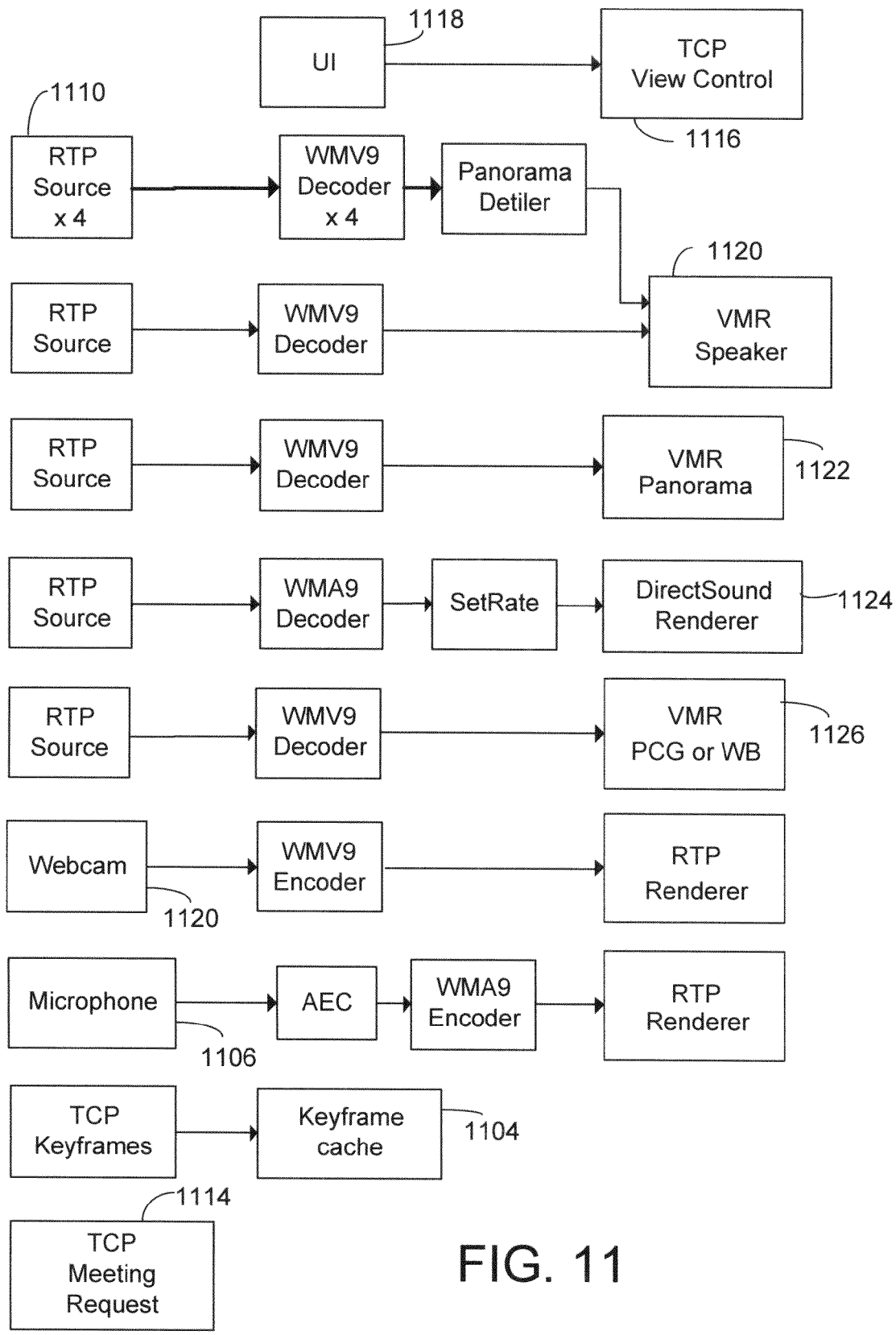
FIG. 11 depicts a client's dataflow of an exemplary embodiment of the DM system and method according to the invention.

The dataflow diagram for one embodiment of the DM client is shown in FIG. 11. The blocks are described below.

Various data sources (RTP) 1110 are decoded and processed. One of these data sources, the panorama data, is input into a Panorama Detiler 1108. The panorama detiler 1108 constructs a speaker view from the tiled images, inverting the cross-blending operation done in the panorama tiler filter. This is output to a Video Mixing Renderer speaker 1120, which displays the speaker on the users screen. Other data sources show the panorama of the meeting room 1122, render the sound 1124, or show the PC graphics capture or the whiteboard images 1126. The audio signal may be compressed via the SetRate module 1112. The SetRate module 1112 provides audio time compression (speeds up audio without changing the pitch). This module also communicates with the DM meeting room server and DM archive server software to change the ASF Reader speed via a TCP connection that is not shown. Also, there may be a web cam 1120, which is processed and rendered. A microphone input 1106 provides audio of the meeting to the remote client. TCP key frames 1114 are also available to the client. The TCP key frames module 1114 reads the whiteboard and PC graphics key frames/thumbnails from the server. In live mode, both key frames and thumbnails are read. In archive mode, only thumbnails are read. The key frame cache 1104 saves the key frames to a local cache. The microphone array 506 output is processed by the AEC module 1128 which performs acoustic echo cancellation, noise suppression and automatic gain control on the audio signal. The TCP view control module 1116 tells the server what speaker view to send (automatic, 360-degree camera, overview, or remote view) and which PC graphics capture/whiteboard stream to send. The UI module 1118 is the DM client user interface that controls what speaker view to display.

2.4.7 DM Shared Application

The DM Shared Application is an application used to share another application with the DM meeting room server and clients connected with the DM meeting room server. The DM Shared Application is intended to run only on clients within the meeting room. The remote client can use DM Client to share an application.

The DM Shared Application user interface provides the following functionality. It allows the user to choose which application to share by displaying a list of sharable applications. It also allows the user to take control of another application by displaying a list of shared applications. The DM Shared Application UI also allows a user to negotiate with another user in taking control of an application. For example, if User A wants to share an application and User B is already sharing an application, User A can attempt to take control. A dialog box pops up on User B's screen asking whether A can take control of the application. User B answers in the affirmative, and then User A has control of the application. The DM Shared Application can be combined with DM Client so that only a single client is needed within our outside of the conference room.

2.4.8 DM Permissions

DM Permissions is an application used by the meeting owners to add or remove data access permission for others to view the meeting. It also allows the meeting owners to delete the meeting. The DM permissions module allows meeting owners to add and remove data access permissions for users. It resolves users using name or alias. If a user belongs to multiple domains, the DM permissions module grants access from all domains. It also allows meeting owners to delete a meeting.

2.5 Scenario

This section describes a scenario of how it is envisioned people will use the DM system to record, broadcast, and remotely participate in meetings.

Fred needs to schedule a meeting for this week to discuss the status of a current project. He checks everyone's calendars and tries to find an open time, but there is no common free time during which everyone can meet. However, he finds an hour when only one person, Barney, cannot make it. He decides to schedule the meeting during that time, and he lets Barney know that he will be able to watch it afterward.

Fred sends out the meeting request using an electronic mail and scheduling program. The meeting request includes the DM-enabled meeting room as a scheduled resource. When Fred shows up for the meeting, he walks over to the DM kiosk and touches the "record a meeting" button on the screen. Because Fred's meeting request included the meeting room, the kiosk automatically fills in the meeting description and participants. He then runs an electronic presentation program and projects his presentation on a local projector in the meeting room. He runs the DM client on his Tablet PC, which displays the agenda. During the meeting he checks off items on the agenda.

Figure 12:
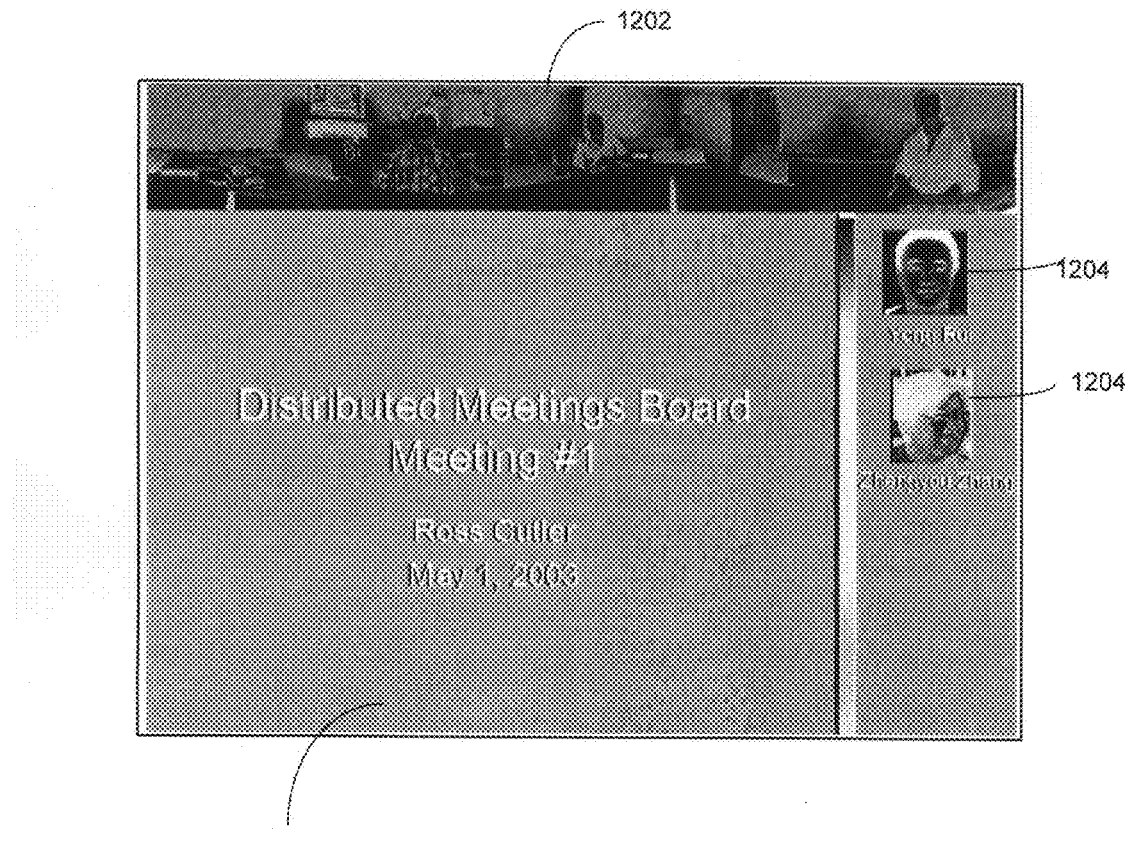
FIG. 12 is an exemplary projector user interface of one embodiment of the DM system and method according to the invention. The conference room is displayed on top and individual remote participants are displayed on the right side. A local software application is displayed in the lower right.

Betty is working in an office on the other side of the corporate campus and receives an electronic mail reminder about the meeting. She needs to attend the meeting, but does not want to commute to and from the meeting. So she clicks a link in the notification to view the broadcast from the meeting, and calls in to the meeting room to establish a link. Once Betty links to the meeting room she is shown on a projector. Betty is displayed in a sub window on the projector screen and says hello to the local participants. An example of such a projector screen is shown in FIG. 12. The conference room is displayed on top 1202 and individual remote participants are displayed on the right side 1204. A local software application, in this case an electronic presentation program, is displayed in the lower right 1206.

During the meeting, Betty is able to see a panoramic image of the meeting, an image of the current speaker, an image of the whiteboard, and an image of whatever is displayed on the projector. Betty asks about the status of the project implementation. Fred displays a schedule electronic file on the projector. Wilma draws a few implementation diagrams on the whiteboard, which gets erased several times during the discussion of various components. Betty has some new market analysis charts in a spread sheet that she wants to share, and she remotely displays them via the meeting room projector.

Pebbles had another meeting which ran late. She does not have time to commute to the meeting, so she connects to the meeting remotely from her notebook computer. She is displayed in on the projector screen next to Betty, and says hello to the team. She is able to see all of the slides and whiteboard key frames already displayed during the meeting, and quickly understands what has been discussed without needing to ask.

Toward the end of meeting, Fred writes several action items on the whiteboard to summarize the meeting. At the end of the meeting, Fred presses the "stop recording" link on the kiosk. The DM archive server processes the recording and sends email to all of the meeting attendees with a URL that points to the archived meeting.

Later that day, Barney gets back to his office and sees the e-mail about the recorded meeting. He clicks the link in the mail to start the DM Client. While watching the meeting, he uses time compression to view the meeting faster. He sees the meeting agenda, and can click on agenda items to jump to when they were discussed in the meeting. Barney also uses the whiteboard key frames to jump directly to the discussion on the implementation, and then clicks individual strokes on the whiteboard to listen to the detailed conversation on each specific point. He has yet to attend a meeting where Dino says anything intelligible, so in the speaker timeline, he unchecks Dino so that the client skips all the times he talks. Fred often makes good points but then talks about random things afterward. When Fred does this, Barney uses the timeline to see where Fred stops talking and skips to that point. Barney has a question about a project feature, which he annotates within the timeline; he sends Fred an email to clarify something, and includes a URL to the point in the meeting for added context. With DM, Barney is able to view the meeting in much less time than would have been required to attend the meeting in person.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Y. Rui, A. Gupta and J. J. Cadiz, Viewing meetings captured by an omni-directional camera, *Proc. ACM CHI '2001*, Seattle, Wash., April, 2001.
[2] L. He, Z. Liu and Z. Zhang. Why Take Notes, Use the Whiteboard Capture System. Microsoft Technical Report, MSR-TR-2002-89.
[3] H. Nanda and R. Cutler, Practical calibrations for a real-time digital omni directional camera. CVPR Technical Sketch, December 2001.
[4] R. Szeliski and H.-Y. Shum. Creating full view panoramic image mosaics and texture-mapped models. Computer Graphics (SIGGRAPH'97), pages 251-258, August 1997.
[5] Michael Brandstein, Darren Ward. Microphone Arrays: Signal Processing Techniques and Applications (Digital Signal Processing (Springer-Verlag).) Author:
[6] W. Jiang and H. Malvar. Adaptive Noise Reduction of Speech Signals. Microsoft Technical Report MSR-TR-2000-86, July 2000.
[7] Liu, Q., Y. Rui, A. Gupta, J. J. Cadiz. Automating Camera Management for Lecture Room Environments. CHI 2001, Vol. No. 3, Issue 1.
[8] L. He and A. Gupta. Exploring Benefits of Non-Linear Time Compression. ACM Multimedia 2001.

Wherefore, what is claimed is:

1. A computer-implemented process for recording an event, comprising the process actions of:
   recording images captured by multiple different cameras of different types simultaneously capturing different portions of an event;
   recording audio synchronized with said recorded images;
   storing said images and synchronized audio as event data on a server capable of distributing the said event data; and
   indexing said stored event data by an audio index and an image index which are displayed to a user to assist in event data playback
   determining graphics key frames that summarize sub-events of said event by analyzing said images captured by a graphics capture device and using said key frames as an index to the corresponding portion of audio and images of the stored event data.

2. The computer-implemented process of claim 1 further comprising the process action of said server transmitting said event data to one or more clients in network connection with said server.

3. The computer-implemented process of claim 2 further comprising the process action of said one or more clients playing back said stored images and synchronized audio.

4. The computer-implemented process of claim 1 wherein said multiple cameras are selected from a group comprising:
   a 360-degree camera centrally positioned to monitor in substantially 360-degrees the space in which the event occurs;
   a remote view camera positioned so as to capture a view of event participants in the space in which the event occurs to be transmitted to a viewer over said network;
   a presenter view camera positioned so as to capture an overview of the space in which said event occurs; and
   a whiteboard capture camera positioned so as to capture strokes written on a whiteboard.

5. The computer-implemented process of claim 1 further comprising a process action of capturing graphics data of said event.

6. The computer-implemented process of claim 4 further comprising the process action of indexing said stored event data by one of a group of process actions comprising:
   determining at least one whiteboard key frame that summarizes a sub-event by analyzing said images captured by said whiteboard camera and using said whiteboard key frames as an index to the corresponding portion of audio and images of the meeting; and
   determining a timeline outlining the sequence of sub-events occurring in the event and using said timeline as an index to a specific portion of the audio or images of the event.

7. The computer-implemented process of claim 1, further comprising using speech recognition to transcribe the audio of the event and using word searches to locate specific portions of said audio wherein the audio can be searched by word searches that are entered by an input device by phonetic spelling.

8. The computer-implemented process of claim 1 wherein the process action of indexing said stored event data comprises determining who is speaking by analyzing audio of said event and segmenting the audio of each speaker to be accessible on an individual basis to be used as an index of said stored event data.

9. The computer-implemented process of claim 1 wherein the process action of indexing said recorded event data comprises analyzing said event audio to categorize tone of voice for event participants speaking at said event and indexing said stored event data by tone of voice.

10. The computer-implemented process of claim 1 wherein the process action of indexing said stored event data comprises determining speaker turn rate, wherein speaker turn rate comprises the number of speakers of a given period of time, and using said speaker turn rate to index said stored event data.

11. The computer-implemented process of claim 1 wherein the process action of indexing said stored event data comprises determining when event recording was turned on and off using event turn on and turn off events to index said stored event data.

12. The computer-implemented process of claim 1 wherein the process action of indexing said stored event data comprises determining when a shared application is started or stopped and using this to index said stored event data.

13. The computer-implemented process of claim 1 wherein the process action of indexing said stored event data comprises determining when someone is pointing at an object and using the pointing event to index to said stored event data.

14. The computer-implemented process of claim 1 further comprising the process action of segmenting the audio from a given speaker in said event.

15. The computer-implemented process of claim 14 further comprising the process action of providing a fast forward function that allows skipping of a portion of the audio of one or more speakers.

16. a computer-implemented process for
viewing an event comprising the process actions of:
simultaneously capturing images of different sub-events of an event with multiple cameras each capturing a different sub-event;
capturing audio associated with the different sub-events synchronized with said captured images;
storing said captured images and associated audio on a server; and
viewing the captured sub-events and associated audio by one or more clients in network connection with said server; and
indexing event data by an audio index and an image index which are displayed to a user to assist in event data playback, wherein said indexing process action comprises determining graphics key frames that summarize sub-events of said event by analyzing said images captured by a graphics capture device and using said key frames as an index to the corresponding portion of audio and images of the stored event data.

* * * * *